United States Patent
Chung et al.

(10) Patent No.: US 12,075,456 B2
(45) Date of Patent: Aug. 27, 2024

(54) METHOD FOR REPORTING CHANNEL STATE INFORMATION IN WIRELESS COMMUNICATION SYSTEM, AND DEVICE FOR SAME

(71) Applicant: LG ELECTRONICS INC., Seoul (KR)

(72) Inventors: Jaehoon Chung, Seoul (KR); Haewook Park, Seoul (KR); Jiwon Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 369 days.

(21) Appl. No.: 17/635,656

(22) PCT Filed: Aug. 13, 2020

(86) PCT No.: PCT/KR2020/010743
§ 371 (c)(1),
(2) Date: Feb. 15, 2022

(87) PCT Pub. No.: WO2021/029695
PCT Pub. Date: Feb. 18, 2021

(65) Prior Publication Data
US 2022/0303999 A1  Sep. 22, 2022

Related U.S. Application Data

(60) Provisional application No. 62/887,643, filed on Aug. 15, 2019, provisional application No. 62/887,633, filed on Aug. 15, 2019.

(30) Foreign Application Priority Data

Oct. 4, 2019 (KR) .................. 10-2019-0123226
Oct. 4, 2019 (KR) .................. 10-2019-0123333

(51) Int. Cl.
*H04W 72/56* (2023.01)
*H04W 72/044* (2023.01)
(Continued)

(52) U.S. Cl.
CPC ..... *H04W 72/542* (2023.01); *H04W 72/0453* (2013.01); *H04W 72/046* (2013.01); *H04W 72/56* (2023.01)

(58) Field of Classification Search
CPC ........... H04W 72/542; H04W 72/0453; H04W 72/046; H04W 72/56; H04B 7/048;
(Continued)

(56) References Cited

U.S. PATENT DOCUMENTS

2019/0081679 A1  3/2019  Davydov et al.
2019/0109626 A1  4/2019  Park et al.
(Continued)

FOREIGN PATENT DOCUMENTS

CN  104734753  6/2015
CN  109565323  4/2019
(Continued)

OTHER PUBLICATIONS

Extended European Search Report in European Appln. No. 20853329.9, dated Jul. 28, 2023, 13 pages.
(Continued)

*Primary Examiner* — Khaled M Kassim
*Assistant Examiner* — Hector Reyes
(74) *Attorney, Agent, or Firm* — Fish & Richardson P.C.

(57) ABSTRACT

Disclosed are a method for reporting channel state information in a wireless communication system, and a device for same.
Specifically, a method for a user equipment (UE) to report channel state information (CSI) in a wireless communication system includes: receiving bandwidth part (BWP) configu-
(Continued)

ration information related to a BWP; receiving information for activating a specific bandwidth part among one or more bandwidth parts based on the BWP configuration information; receiving a reference signal; calculating CSI based on the reference signal; and transmitting the CSI by omitting a part of the CSI in the activated specific bandwidth part, based on a priority rule, wherein the CSI includes information related with coefficients, and each of elements of the information related to the coefficients is classified as a first group and a second group based on a priority value, wherein the priority value is determined as an order in which a higher index and a lower index of indexes of a frequency domain related to the elements are sequentially crossed based on a predefined specific index, and wherein a priority of the first group is defined as being higher than a priority of the second group in the priority rule.

14 Claims, 14 Drawing Sheets

(51) Int. Cl.
  *H04W 72/0453* (2023.01)
  *H04W 72/542* (2023.01)
(58) Field of Classification Search
  CPC .. H04B 7/0626; H04B 7/0636; H04B 7/0658; H04L 1/0026; H04L 1/0029; H04L 5/0064; H04L 5/0057; H04L 5/0005; H04L 5/0098
  See application file for complete search history.

(56) References Cited

U.S. PATENT DOCUMENTS

| | | | |
|---|---|---|---|
| 2019/0159219 A1 | 5/2019 | Hosseini et al. | |
| 2019/0199420 A1 | 6/2019 | Faxér et al. | |
| 2019/0223164 A1 | 7/2019 | He et al. | |
| 2019/0229791 A1 | 7/2019 | Song et al. | |
| 2021/0099992 A1* | 4/2021 | Mao | H04L 1/0026 |
| 2021/0234595 A1* | 7/2021 | Zhang | H04L 5/0094 |
| 2021/0307025 A1* | 9/2021 | Hosseini | H04W 72/54 |
| 2022/0149914 A1* | 5/2022 | Hindy | H04B 7/0478 |
| 2022/0149915 A1* | 5/2022 | Mittal | H04B 7/0626 |
| 2022/0239360 A1* | 7/2022 | Faxér | H04B 7/0478 |
| 2022/0360312 A1* | 11/2022 | Rupasinghe | H04L 5/0055 |

FOREIGN PATENT DOCUMENTS

| | | |
|---|---|---|
| KR | 20190038461 | 4/2019 |
| WO | WO2019/039843 | 2/2019 |
| WO | WO2019/098799 | 5/2019 |

OTHER PUBLICATIONS

Huawei, HiSilicon, "Transmission with configured grant in NR unlicensed band" 3GPP TSG RAN WG1, Meeting #96, R1-1903931, Xi'an, China, Apr. 8-12, 2019, 19 pages.
Office Action in Chinese Appln. No. 202080058674.0, mailed on Jun. 23, 2023, 22 pages (English Translation).
Ericsson, "On CSI omission procedure," R1-1907076, Presented at 3GPP TSG RAN WG1 Meeting RAN1#97, Reno, US, May 13-17, 2019, 6 pages.
International Search Report in International Appln. No. PCT/KR2020/010743, dated Nov. 24, 2020, 5 pages (with English translation).
Nokia & Nokia Shanghai Bell, "On the proposals for Rel-16 codebook strongest coefficient indicator," R1-1907719, Presented at 3GPP TSG RAN WG1 Meeting #97, Reno, USA, May 13-May 17, 2019, 4 pages.
Samsung, "On strongest coefficient indicator," R1-1907710, Presented at 3GPP TSG RAN WG1 meeting #97, Reno, USA, May 13-17, 2019, 6 pages.

* cited by examiner

[FIG. 1]
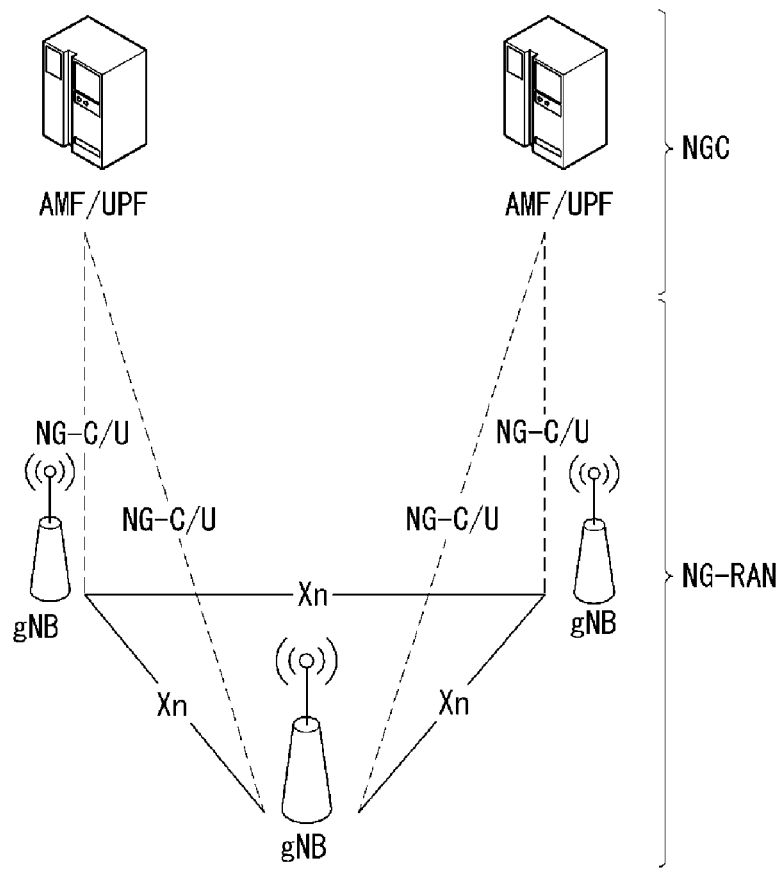
[FIG. 2]
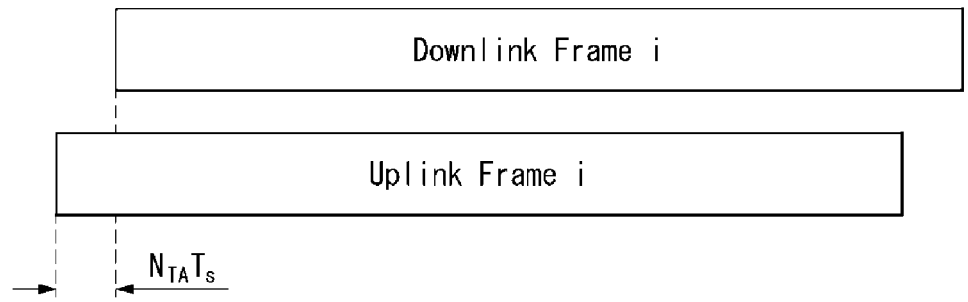

[FIG. 3]
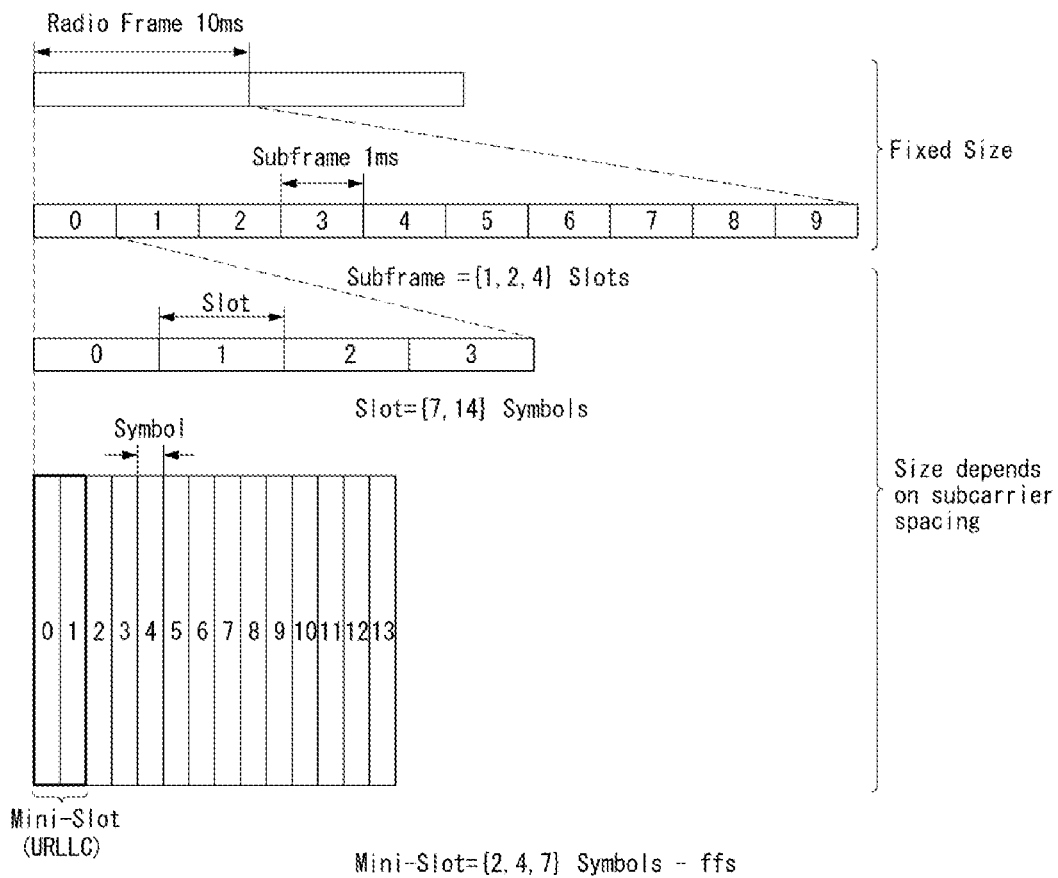

[FIG. 4]
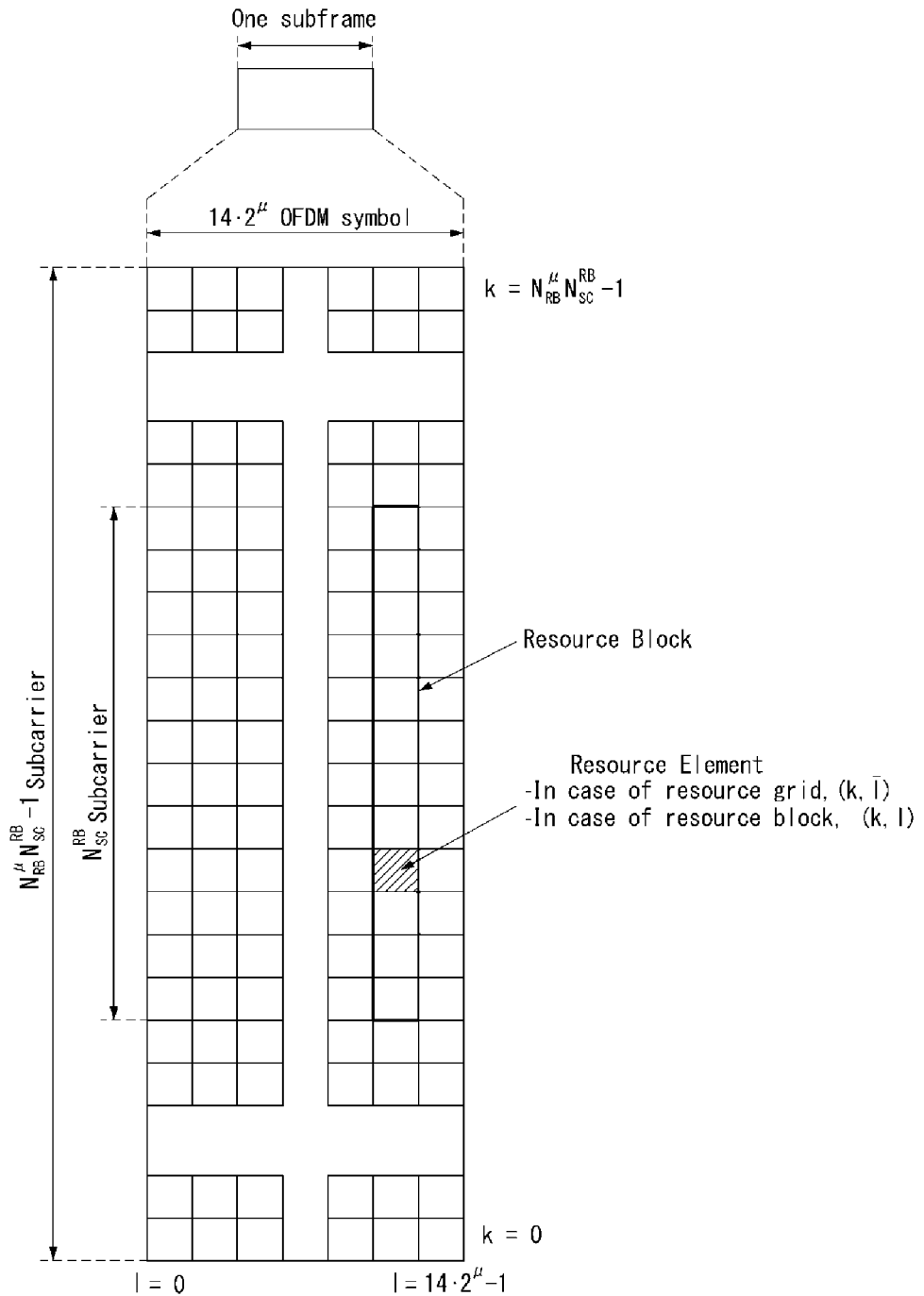

[FIG. 5]
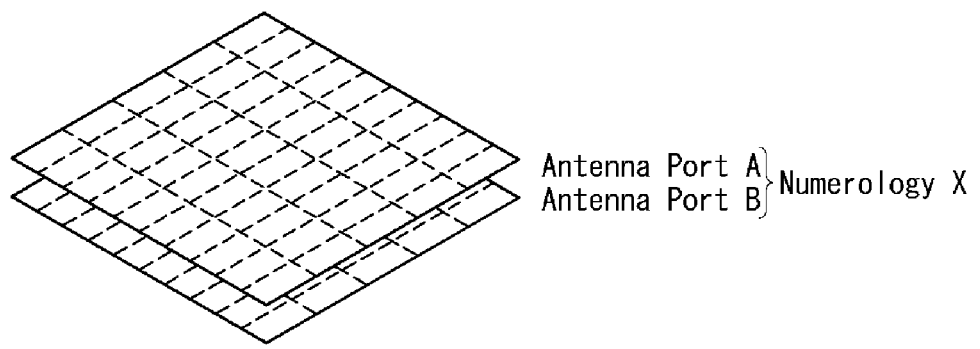
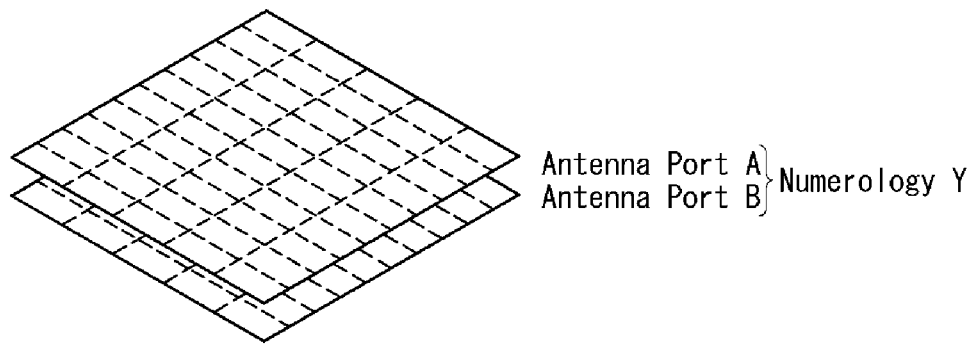

[FIG. 6]
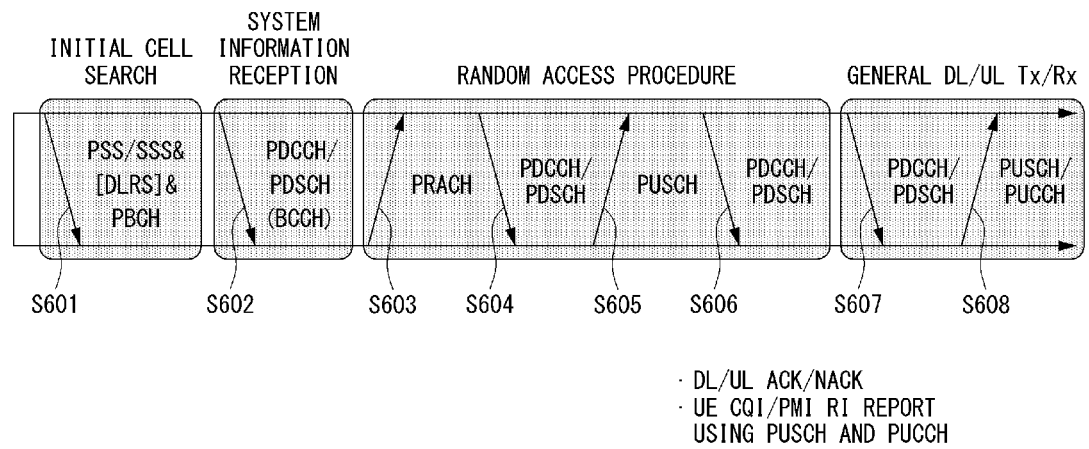
[FIG. 7]
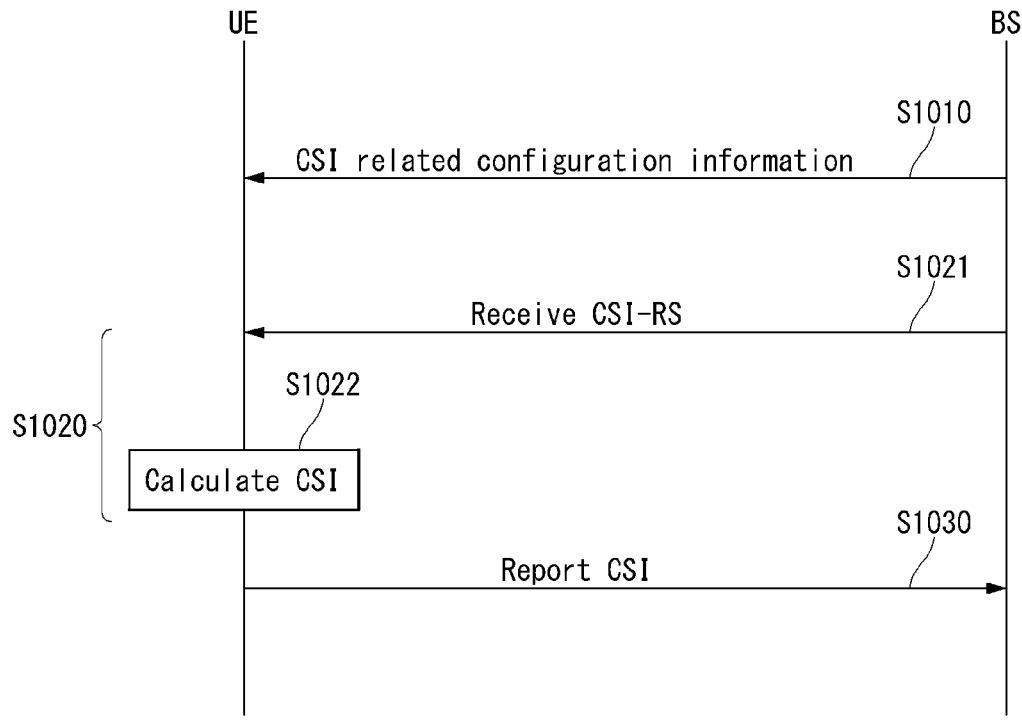

[FIG. 8]
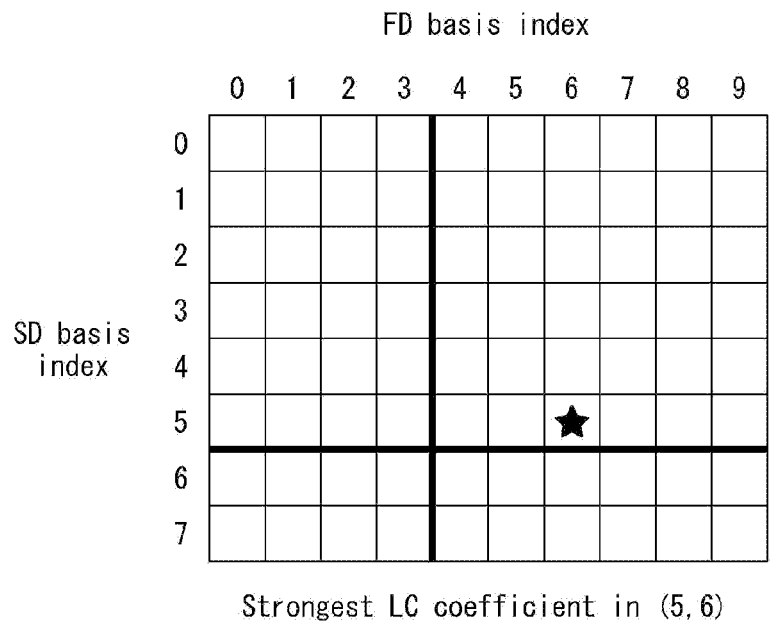
Strongest LC coefficient in (5,6)
(a)
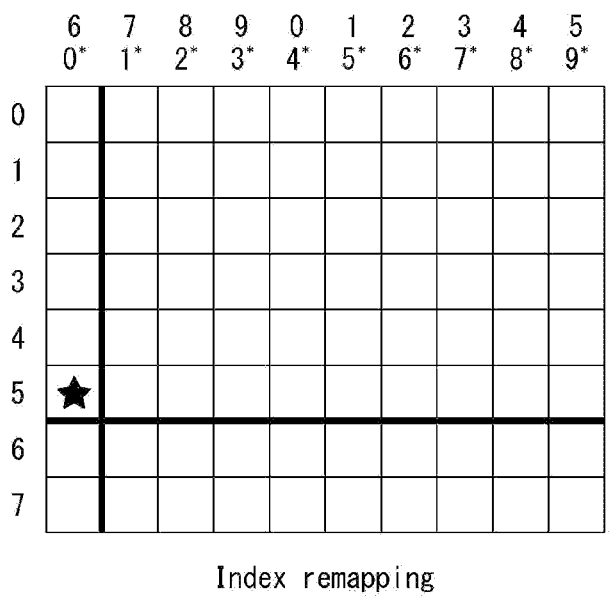
Index remapping
(b)

[FIG. 9]
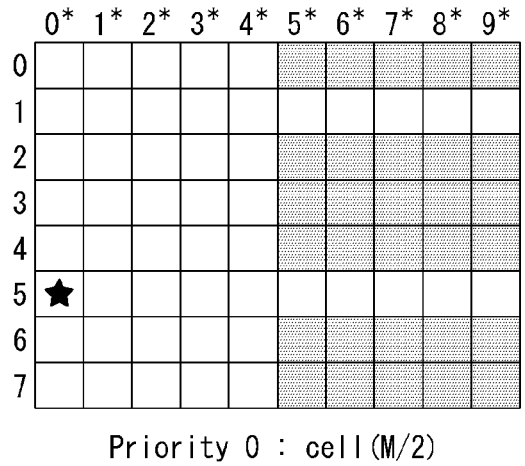
Priority 0 : cell(M/2)
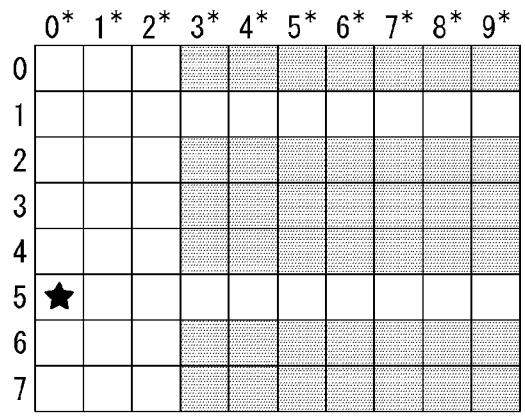
Priority 1 : cell(M/4)
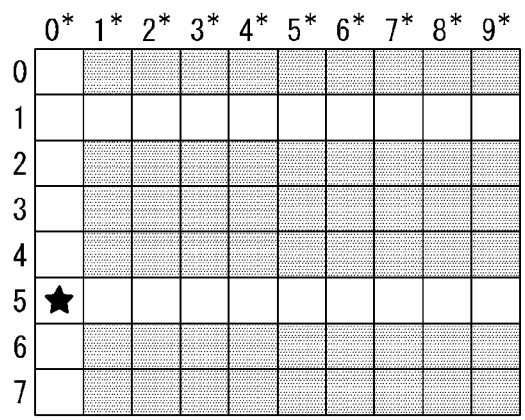
Priority 2 : single FD basis

[FIG. 10]
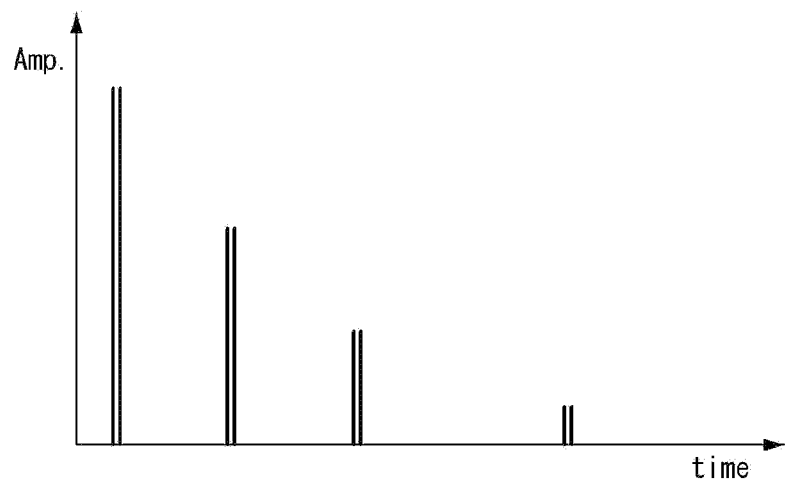
(a)
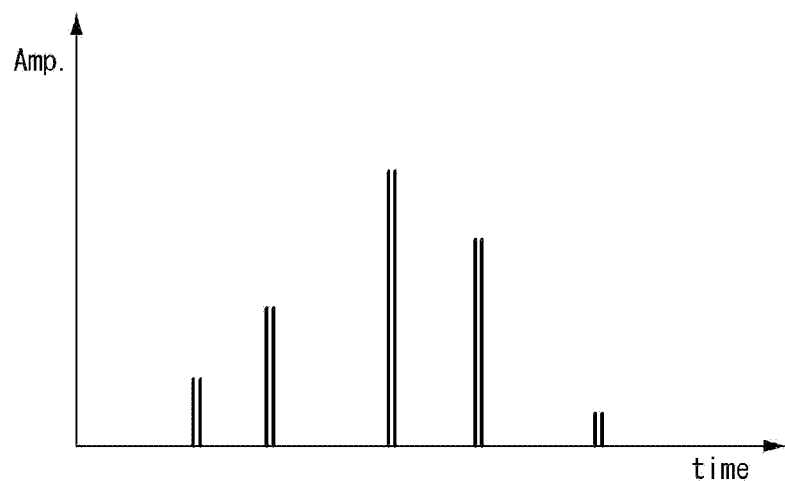
(b)

[FIG. 11]

Priority 0:pair SD basis

Priority 1: single SD basis

[FIG. 12]
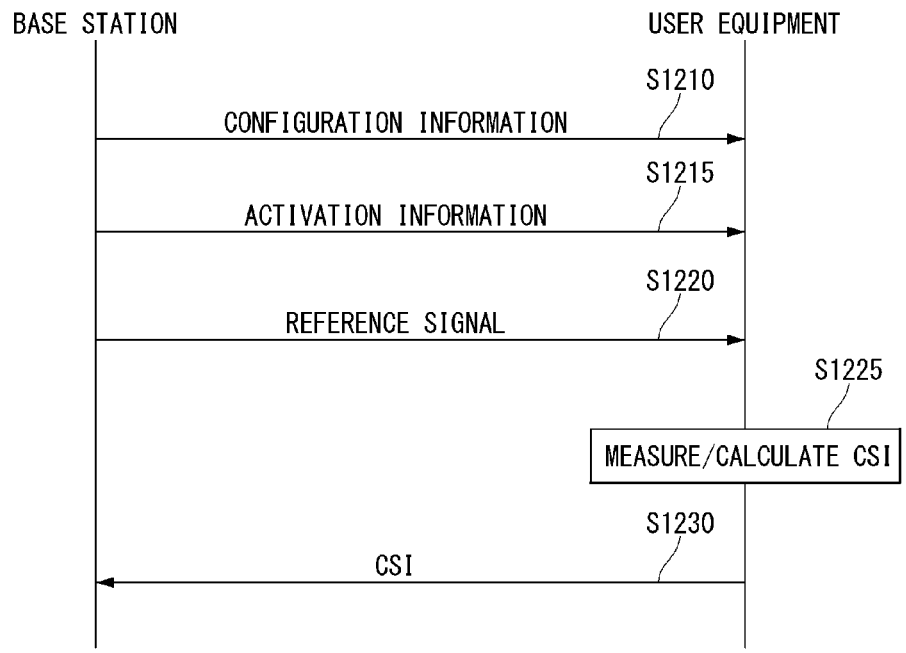
[FIG. 13]
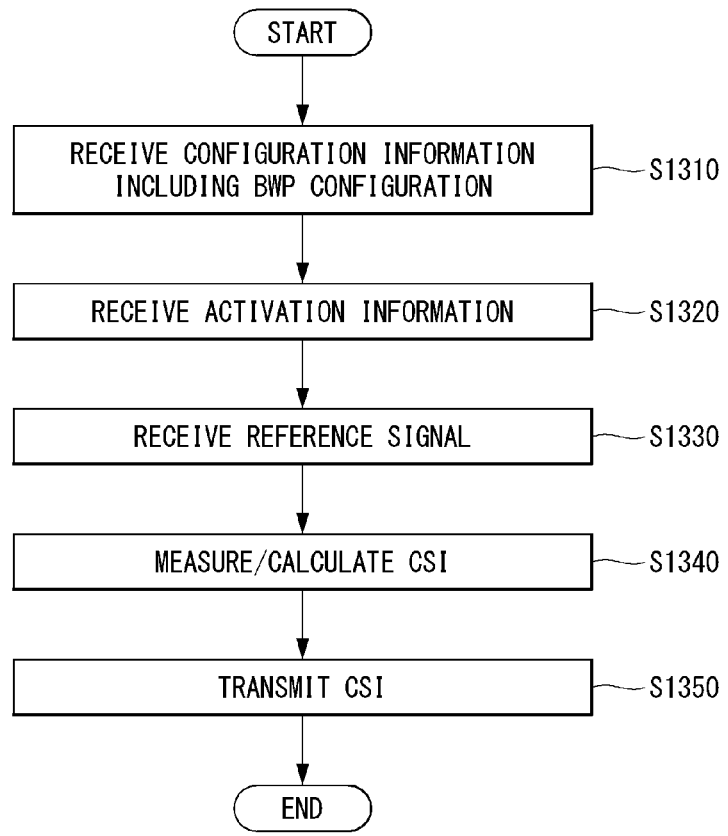

[FIG. 14]
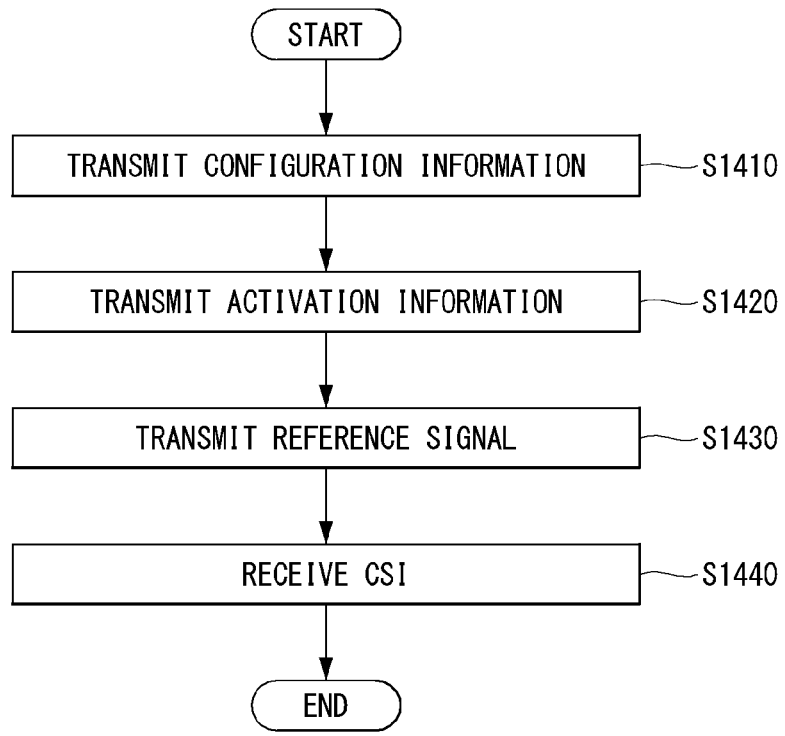
[FIG. 15]
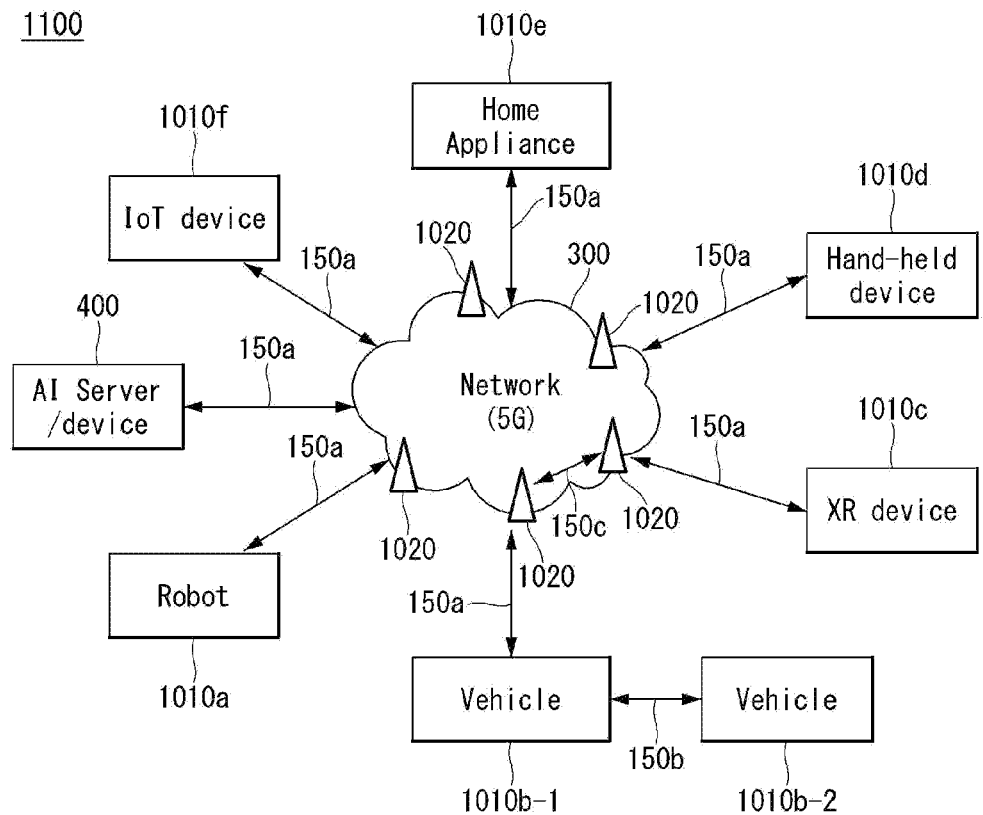

[FIG. 16]
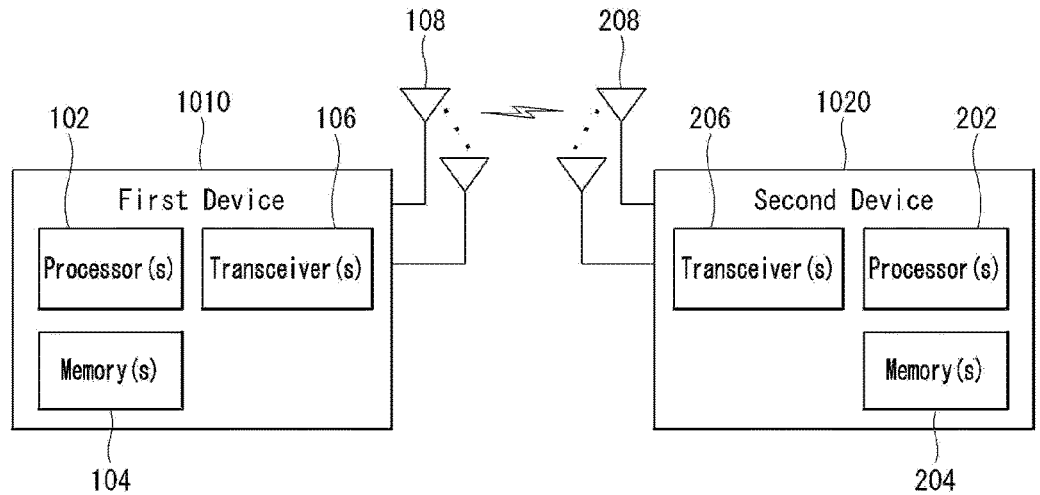
[FIG. 17]
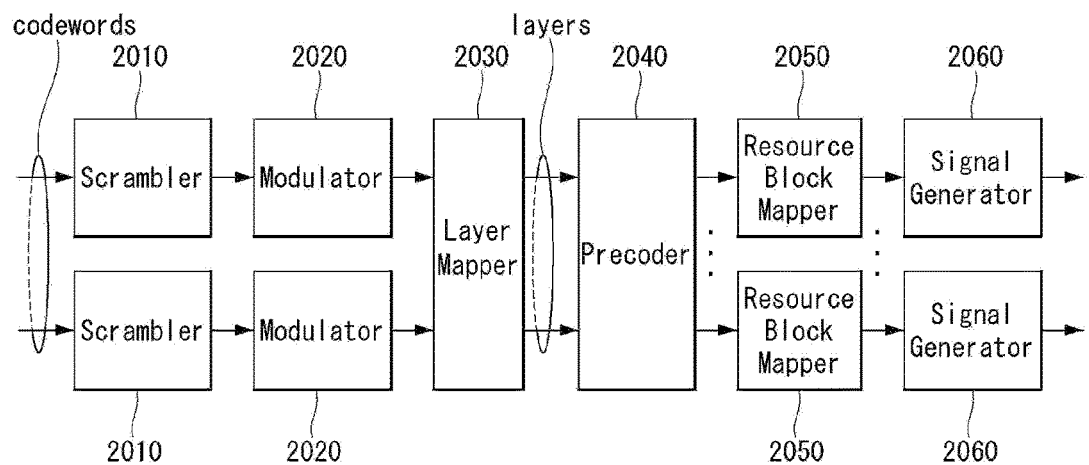

[FIG. 18]
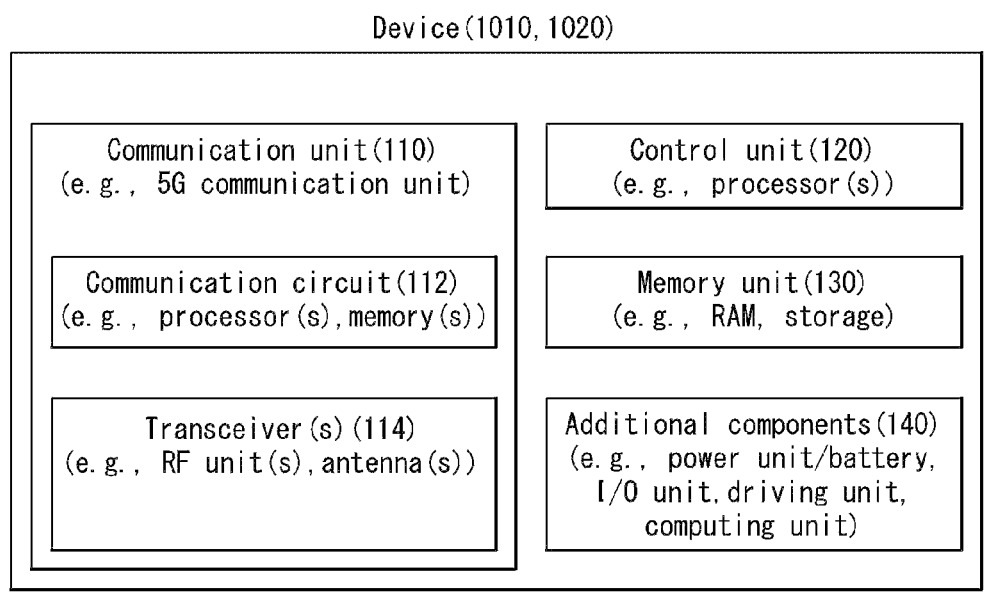

[FIG. 19]
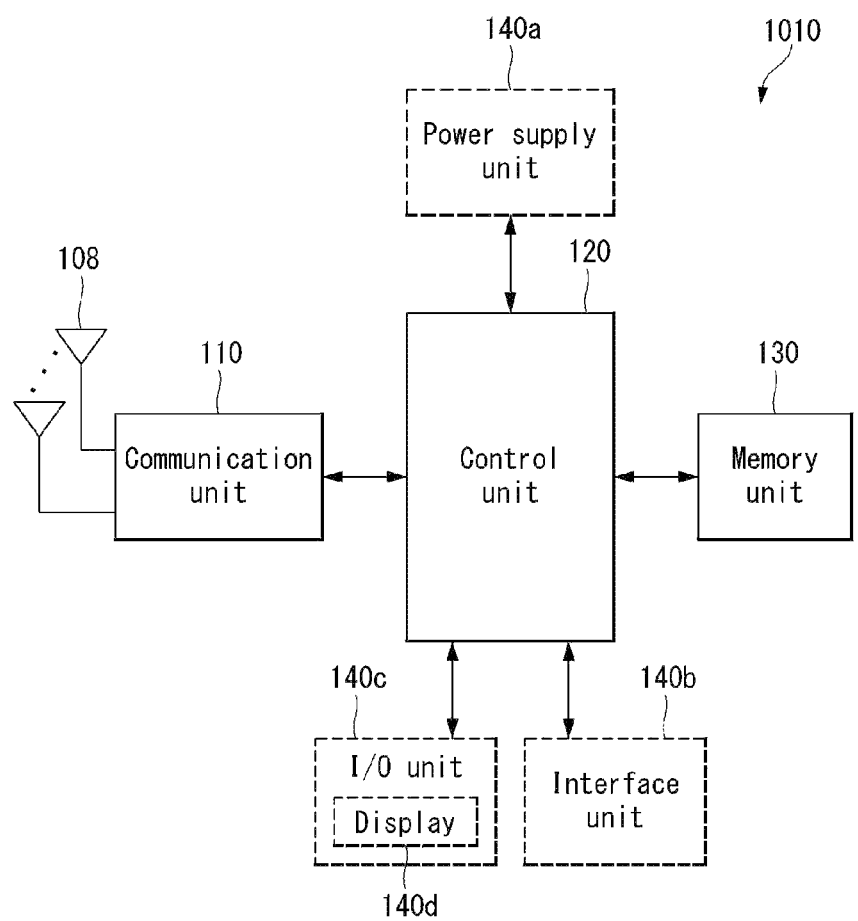

METHOD FOR REPORTING CHANNEL STATE INFORMATION IN WIRELESS COMMUNICATION SYSTEM, AND DEVICE FOR SAME

CROSS-REFERENCE TO RELATED APPLICATION

This application is the National Stage filing under 35 U.S.C. 371 of International Application No. PCT/KR2020/010743, filed on Aug. 13, 2020, which claims the benefit of (1) U.S. provisional Application 62/887,633, filed on Aug. 15, 2019, (2) U.S. provisional Application 62/887,643, filed on Aug. 15, 2019, (3) KR Application No. 10-2019-0123226, filed on Oct. 4, 2019, and (4) KR Application No. 10-2019-0123333, filed on Oct. 4, 2019, the contents of which are all hereby incorporated by reference herein in their entirety.

TECHNICAL FIELD

The present disclosure relates to a wireless communication system, and more particularly, to a method for reporting channel state information in consideration of a payload of channel state information, and a device for supporting the same.

BACKGROUND ART

Mobile communication systems have been developed to guarantee user activity while providing voice services. Mobile communication systems are expanding their services from voice only to data. Current soaring data traffic is depleting resources and users' demand for higher-data rate services is leading to the need for more advanced mobile communication systems.

Next-generation mobile communication systems are required to meet, e.g., handling of explosively increasing data traffic, significant increase in per-user transmission rate, working with a great number of connecting devices, and support for very low end-to-end latency and high-energy efficiency. To that end, various research efforts are underway for various technologies, such as dual connectivity, massive multiple input multiple output (MIMO), in-band full duplex, non-orthogonal multiple access (NOMA), super wideband support, and device networking.

DISCLOSURE

Technical Problem

The present disclosure proposes a method of reporting channel state information (CSI) in a wireless communication system.

Specifically, the present disclosure considers the payload of the channel state information (CSI), and when the size of the payload of the channel state information is greater than the resource capacity allocated for the CSI, proposes a method of omitting a part of the CSI.

In addition, the present disclosure proposes a method of determining a priority of CSI parameters in order to perform omission of a part of channel state information.

In addition, the present disclosure proposes a method of reporting CSI by configuring the CSI into a first part and a second part.

Technical problems to be solved by the present disclosure are not limited by the above-mentioned technical problems, and other technical problems which are not mentioned above can be clearly understood from the following description by those skilled in the art to which the present disclosure pertains.

Technical Solution

In the present disclosure, a method for a user equipment (UE) to report channel state information (CSI) in a wireless communication system, the method comprising: receiving bandwidth part (BWP) configuration information related to a BWP; receiving information for activating a specific bandwidth part among one or more bandwidth parts based on the BWP configuration information; receiving a reference signal; calculating CSI based on the reference signal; and transmitting the CSI by omitting a part of the CSI in the activated specific bandwidth part, based on a priority rule, wherein the CSI includes information related with coefficients, and each of elements of the information related to the coefficients is classified as a first group and a second group based on a priority value, wherein the priority value is determined as an order in which a higher index and a lower index of indexes of a frequency domain related to the elements are sequentially crossed based on a predefined specific index, and wherein a priority of the first group is defined as higher than a priority of the second group in the priority rule.

Furthermore, in the present disclosure, wherein the predefined specific index is related to an index in the frequency domain of a strongest coefficient among the coefficients.

Furthermore, in the present disclosure, wherein the predefined specific index is 0.

Furthermore, in the present disclosure, wherein the priority value is determined based on i) a layer index ii) an index of a spatial domain related to each element and iii) an index of a frequency domain related to each elements.

Furthermore, in the present disclosure, wherein the priority value increases in an ascending order of the index of the spatial domain.

Furthermore, in the present disclosure, wherein the smaller the priority value, the higher the priority of each element.

Furthermore, in the present disclosure, wherein a priority of i) the index of the spatial domain of a strongest coefficient and ii) an index of the spatial domain corresponding to a beam having an opposite polarization with respect to a beam corresponding to the strongest coefficient is the highest.

Furthermore, in the present disclosure, wherein a part of the CSI is omitted and transmitted through the PUSCH.

Furthermore, in the present disclosure, wherein the CSI includes a first part and a second part, and wherein a potion of the second part is omitted.

Furthermore, in the present disclosure, wherein the CSI further includes information related to a omission of the portion.

Furthermore, in the present disclosure, wherein the information related to the omission includes at least one of (i) information on whether to omit, (ii) information on an object to be omitted or (iii) information on a quantity to be omitted.

Furthermore, in the present disclosure, wherein the information related with coefficients includes at least one of information on a amplitude coefficient, ii) information on a phase coefficient, or iii) bitmap information related to the amplitude coefficient and the phase coefficient.

Furthermore, in the present disclosure, further comprising: receiving, from the base station, configuration information related with the CSI, wherein a resource region for the CSI report is allocated based on the configuration information, and wherein a payload size of the calculated CSI exceeds the resource region.

Furthermore, in the present disclosure, a user equipment (UE) for transmitting and receiving data in a wireless communication system, the UE comprises: one or more transceivers; one or more processors; and one or more memories storing instructions for operations executed by the one or more processors and coupled to the one or more processors, wherein the operations comprises: receiving bandwidth part (BWP) configuration information related to a BWP; receiving information for activating a specific bandwidth part among one or more bandwidth parts based on the BWP configuration information; receiving a reference signal; calculating CSI based on the reference signal; and transmitting the CSI by omitting a part of the CSI in the activated specific bandwidth part, based on a priority rule, wherein the CSI includes information related with coefficients, and each of elements of the information related to the coefficients is classified as a first group and a second group based on a priority value, wherein the priority value is determined as an order in which a higher index and a lower index of indexes of a frequency domain related to the elements are sequentially crossed based on a predefined specific index, and wherein a priority of the first group is defined as higher than a priority of the second group in the priority rule.

Furthermore, in the present disclosure, wherein the predefined specific index is related to an index in the frequency domain of a strongest coefficient among the coefficients.

Furthermore, in the present disclosure, wherein the priority value is determined based on i) a layer index ii) an index of a spatial domain related to each element and iii) an index of a frequency domain related to each elements.

Furthermore, in the present disclosure, wherein the priority value increases in an ascending order of the index of the spatial domain.

Furthermore, in the present disclosure, a method for a base station to receive channel state information (CSI) in a wireless communication system, the method comprising: transmitting, to a user equipment (UE), bandwidth part (BWP) configuration information related to a BWP; transmitting, to the UE, information for activating a specific bandwidth part among one or more bandwidth parts based on the BWP configuration information; transmitting, to the UE, a reference signal; receiving, from the UE, a CSI report in which part of the CSI measured based on the reference signal are omitted based on the priority rule, wherein the CSI report is received based on the activated specific bandwidth part, wherein the CSI includes information related with coefficients, and each of elements of the information related to the coefficients is classified as a first group and a second group based on a priority value, wherein the priority value is determined as an order in which a higher index and a lower index of indexes of a frequency domain related to the elements are sequentially crossed based on a predefined specific index, and wherein a priority of the first group is defined as higher than a priority of the second group in the priority rule.

Furthermore, in the present disclosure, a base station (BS) for transmitting and receiving data in a wireless communication system, the base station comprising: one or more transceivers; one or more processors; and one or more memories storing instructions for operations executed by the one or more processors and coupled to the one or more processors, wherein the operations comprises: transmitting, to a user equipment (UE), bandwidth part (BWP) configuration information related to a BWP; transmitting, to the UE, information for activating a specific bandwidth part among one or more bandwidth parts based on the BWP configuration information; transmitting, to the UE, a reference signal; receiving, from the UE, a CSI report in which part of the CSI measured based on the reference signal are omitted based on the priority rule, wherein the CSI report is received based on the activated specific bandwidth part, wherein the CSI includes information related with coefficients, and each of elements of the information related to the coefficients is classified as a first group and a second group based on a priority value, wherein the priority value is determined as an order in which a higher index and a lower index of indexes of a frequency domain related to the elements are sequentially crossed based on a predefined specific index, and wherein a priority of the first group is defined as higher than a priority of the second group in the priority rule.

Furthermore, in the present disclosure, an apparatus comprising one or more memories and one or more processors operatively coupled to the one or more memories, the apparatus comprising: wherein the one or more processors controls the apparatus to: receive bandwidth part (BWP) configuration information related to a BWP; receive information for activating a specific bandwidth part among one or more bandwidth parts based on the BWP configuration information; receive a reference signal; calculate CSI based on the reference signal; and transmit the CSI by omitting a part of the CSI in the activated specific bandwidth part, based on a priority rule, wherein the CSI includes information related with coefficients, and each of elements of the information related to the coefficients is classified as a first group and a second group based on a priority value, wherein the priority value is determined as an order in which a higher index and a lower index of indexes of a frequency domain related to the elements are sequentially crossed based on a predefined specific index, and wherein a priority of the first group is defined as higher than a priority of the second group in the priority rule.

Furthermore, in the present disclosure, one or more non-transitory computer-readable media storing one or more instructions, the one or more instructions executable by one or more processors comprising: an instruction indicates a user equipment (UE) to: receive bandwidth part (BWP) configuration information related to a BWP; receive information for activating a specific bandwidth part among one or more bandwidth parts based on the BWP configuration information; receive a reference signal; calculate CSI based on the reference signal; and transmit the CSI by omitting a part of the CSI in the activated specific bandwidth part, based on a priority rule, wherein the CSI includes information related with coefficients, and each of elements of the information related to the coefficients is classified as a first group and a second group based on a priority value, wherein the priority value is determined as an order in which a higher index and a lower index of indexes of a frequency domain related to the elements are sequentially crossed based on a predefined specific index, and wherein a priority of the first group is defined as higher than a priority of the second group in the priority rule.

Advantageous Effects

According to an embodiment of the present disclosure, it is possible to report the channel state information to the base station in consideration of the payload size of the channel state information.

In addition, according to an embodiment of the present disclosure, it is possible to activate a specific bandwidth part (BWP), and report channel state information based on the activated specific BWP.

According to an embodiment of the present disclosure, it is possible to report the channel state information within an allocated resource capacity by partially omitting channel state information.

In addition, according to an embodiment of the present disclosure, it is possible to report channel state information by performing an omitting operation in consideration of a priority of components of the channel state information to minimize a loss of information within the allocated resource capacity.

In addition, according to an embodiment of the present disclosure, it is possible to eliminate ambiguity of operations related to a CSI omission.

Effects obtainable from the present disclosure are not limited by the effects mentioned above, and other effects which are not mentioned above can be clearly understood from the following description by those skilled in the art to which the present disclosure pertains.

BRIEF DESCRIPTION OF DRAWINGS

The accompanying drawings, which are included to provide a further understanding of the present disclosure and constitute a part of the detailed description, illustrate embodiments of the present disclosure and together with the description serve to explain the principle of the present disclosure.

FIG. 1 is a diagram illustrating an example of an overall system structure of NR to which a method proposed in the present disclosure may be applied.

FIG. 2 illustrates a relationship between an uplink frame and a downlink frame in a wireless communication system to which a method proposed in the present disclosure may be applied.

FIG. 3 illustrates an example of a frame structure in an NR system.

FIG. 4 illustrates an example of a resource grid supported by a wireless communication system to which a method proposed in the present disclosure may be applied.

FIG. 5 illustrates examples of a resource grid for each antenna port and numerology to which a method proposed in the present disclosure may be applied.

FIG. 6 illustrates physical channels and general signal transmission used in a 3GPP system.

FIG. 7 is a flowchart illustrating an example of a CSI-related procedure.

FIG. 8 illustrates an example of index remapping in a precoding matrix based on a strongest coefficient indicator (SCI).

FIG. 9 illustrates an example of setting three levels of omission priority in a frequency domain together with a pair of SD bases.

FIG. 10 illustrates an example of a delay profile of a radio channel.

FIG. 11 illustrates an example of setting the omission priority in a spatial domain (SD) with a single frequency domain (FD) basis.

FIG. 12 illustrates an example of a signaling flowchart between a user equipment (UE) and a base station to which the method and/or embodiment proposed in the present disclosure can be applied.

FIG. 13 illustrates an example of an operation sequence of a UE performing CSI reporting to which the method and/or embodiment proposed in the present disclosure may be applied.

FIG. 14 illustrates an example of an operation sequence of a base station to which the method and/or embodiment proposed in the present disclosure may be applied.

FIG. 15 illustrates a communication system applied to the present disclosure.

FIG. 16 illustrates a wireless device which may be applied to the present disclosure.

FIG. 17 illustrates a signal processing circuit for a transmit signal.

FIG. 18 illustrates another example of a wireless device applied to the present disclosure.

FIG. 19 illustrates a hand-held device applied to the present disclosure.

MODE FOR DISCLOSURE

Reference will now be made in detail to embodiments of the disclosure, examples of which are illustrated in the accompanying drawings. A detailed description to be disclosed below together with the accompanying drawing is to describe exemplary embodiments of the present disclosure and not to describe a unique embodiment for carrying out the present disclosure. The detailed description below includes details to provide a complete understanding of the present disclosure. However, those skilled in the art know that the present disclosure can be carried out without the details.

In some cases, in order to prevent a concept of the present disclosure from being ambiguous, known structures and devices may be omitted or illustrated in a block diagram format based on core functions of each structure and device.

Hereinafter, downlink (DL) means communication from the base station to the terminal and uplink (UL) means communication from the terminal to the base station. In downlink, a transmitter may be part of the base station, and a receiver may be part of the terminal. In uplink, the transmitter may be part of the terminal and the receiver may be part of the base station. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), an Augmented Reality (AR) device, a Virtual Reality (VR) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, the Unmanned Aerial Vehicle (UAV), the Augmented Reality (AR) device, the Virtual Reality (VR) device, and the like.

The following technology may be used in various radio access system including CDMA, FDMA, TDMA, OFDMA, SC-FDMA, and the like. The CDMA may be implemented as radio technology such as Universal Terrestrial Radio Access (UTRA) or CDMA2000. The TDMA may be implemented as radio technology such as a global system for mobile communications (GSM)/general packet radio service (GPRS)/enhanced data rates for GSM evolution (EDGE). The OFDMA may be implemented as radio technology such as Institute of Electrical and Electronics Engineers (IEEE) 802.11 (Wi-Fi), IEEE 802.16 (WiMAX), IEEE 802.20, Evolved UTRA (E-UTRA), or the like. The UTRA is a part of Universal Mobile Telecommunications System (UMTS). 3rd Generation Partnership Project (3GPP) Long Term Evolution (LTE) is a part of Evolved UMTS (E-UMTS) using the E-UTRA and LTE-Advanced (A)/LTE-A pro is an evolved version of the 3GPP LTE. 3GPP NR (New Radio or New Radio Access Technology) is an evolved version of the 3GPP LTE/LTE-A/LTE-A pro.

For clarity of description, the technical spirit of the present disclosure is described based on the 3GPP communication system (e.g., LTE-A or NR), but the technical spirit of the present disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a standard document detail number. Matters disclosed in a standard document opened before the present disclosure may be referred to for a background art, terms, abbreviations, etc., used for describing the present disclosure. For example, the following documents may be referred to.

3GPP LTE
  36.211: Physical channels and modulation
  36.212: Multiplexing and channel coding
  36.213: Physical layer procedures
  36.300: Overall description
  36.331: Radio Resource Control (RRC)
3GPP NR
  38.211: Physical channels and modulation
  38.212: Multiplexing and channel coding
  38.213: Physical layer procedures for control
  38.214: Physical layer procedures for data
  38.300: NR and NG-RAN Overall Description
  38.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. The introduction of next generation radio access technology considering enhanced mobile broadband communication (eMBB), massive MTC (mMTC), ultra-reliable and low latency communication (URLLC) is discussed, and in the present disclosure, the technology is called new RAT for convenience. The NR is an expression representing an example of 5G radio access technology (RAT).

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5Q and dedicated voice services may not be first seen in the 5G era. In 5Q it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5Q along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

In a new RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. Different numerologies may be defined by scaling reference subcarrier spacing to an integer N.

Definition of Terms eLTE eNB: The eLTE eNB is the evolution of eNB that supports connectivity to EPC and NGC.

gNB: Anode which supports the NR as well as connectivity to NGC.

New RAN: A radio access network which supports either NR or E-UTRA or interfaces with the NGC.

Network slice: A network slice is a network created by the operator customized to provide an optimized solution for a specific market scenario which demands specific requirements with end-to-end scope.

Network function: A network function is a logical node within a network infrastructure that has well-defined external interfaces and well-defined functional behaviour.

NG-C: A control plane interface used on NG2 reference points between new RAN and NGC.

NG-U: A user plane interface used on NG3 references points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Overview of System

FIG. 1 illustrates an example of an overall structure of a NR system to which a method proposed in the present disclosure is applicable.

Referring to FIG. 1, an NG-RAN consists of gNBs that provide an NG-RA user plane (new AS sublayer/PDCP/RLC/MAC/PHY) and control plane (RRC) protocol terminations for a user equipment (UE).

The gNBs are interconnected with each other by means of an Xn interface.

The gNBs are also connected to an NGC by means of an NG interface.

More specifically, the gNBs are connected to an access and mobility management function (AMF) by means of an N2 interface and to a user plane function (UPF) by means of an N3 interface.

New RAT (NR) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or A). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

The NR supports multiple numerologies (or subcarrier spacing (SCS)) for supporting various 5G services. For example, when the SCS is 15 kHz, a wide area in traditional cellular bands is supported and when the SCS is 30 kHz/60 kHz, dense-urban, lower latency, and wider carrier bandwidth are supported, and when the SCS is 60 kHz or higher therethan, a bandwidth larger than 24.25 GHz is supported in order to overcome phase noise.

An NR frequency band is defined as frequency ranges of two types (FR1 and FR2). FR1 and FR2 may be configured as shown in Table 2 below. Further, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$ DL and UL transmission is configured as a radio frame having a section of $T_f=(\Delta f_{max} N_f/100) \cdot T_s=10$ ms. The radio frame is composed of ten subframes each having a section of $T_{sf}=(\Delta f_{max} N_f/1000) \cdot T_s=1$ ms. In this case, there may be a set of UL frames and a set of DL frames.

FIG. 2 illustrates a relation between an uplink frame and a downlink frame in a wireless communication system to which a method proposed in the present disclosure is applicable.

As illustrated in FIG. 2, uplink frame number i for transmission from a user equipment (UE) shall start $T_{TA}=N_{TA}T_s$ before the start of a corresponding downlink frame at the corresponding UE.

Regarding the numerology μ, slots are numbered in increasing order of $n_s^\mu \in \{0, \ldots, N_{subframe}^{slot,\mu}-1\}$ within a subframe and are numbered in increasing order of $n_{s,f}^\mu \in \{0, \ldots, N_{frame}^{slot,\mu}-1\}$ within a radio frame. One slot consists of consecutive OFDM symbols of $N_{symb}^\mu$, and $N_{symb}^\mu$ is determined depending on a numerology used and slot configuration. The start of slots $n_s^\mu$ in a subframe is aligned in time with the start of OFDM symbols $n_s^\mu N_{symb}^\mu$ in the same subframe.

Not all UEs are able to transmit and receive at the same time, and this means that not all OFDM symbols in a downlink slot or an uplink slot are available to be used.

Table 3 represents the number $N_{symb}^{slot}$ of OFDM symbols per slot, the number $N_{slot}^{frame,\mu}$ of slots per radio frame, and the number $N_{slot}^{subframe,\mu}$ of slots per subframe in a normal CP. Table 4 represents the number of OFDM symbols per slot, the number of slots per radio frame, and the number of slots per subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 3 illustrates an example of a frame structure in a NR system. FIG. 3 is merely for convenience of explanation and does not limit the scope of the present disclosure.

In Table 4, in case of μ=2, i.e., as an example in which a subcarrier spacing (SCS) is 60 kHz, one subframe (or frame) may include four slots with reference to Table 3, and one subframe={1, 2, 4} slots shown in FIG. 3, for example, the number of slot(s) that may be included in one subframe may be defined as in Table 3.

Further, a mini-slot may consist of 2, 4, or 7 symbols, or may consist of more symbols or less symbols.

In regard to physical resources in the NR system, an antenna port, a resource grid, a resource element, a resource block, a carrier part, etc. may be considered.

Hereinafter, the above physical resources that can be considered in the NR system are described in more detail.

First, in regard to an antenna port, the antenna port is defined so that a channel over which a symbol on an antenna port is conveyed can be inferred from a channel over which another symbol on the same antenna port is conveyed. When large-scale properties of a channel over which a symbol on one antenna port is conveyed can be inferred from a channel over which a symbol on another antenna port is conveyed, the two antenna ports may be regarded as being in a quasi co-located or quasi co-location (QC/QCL) relation. Here, the large-scale properties may include at least one of delay spread, Doppler spread, frequency shift, average received power, and received timing.

FIG. 4 illustrates an example of a resource grid supported in a wireless communication system to which a method proposed in the present disclosure is applicable.

Referring to FIG. 4, a resource grid consists of $N_{RB}^\mu N_{sc}^{RB}$ subcarriers on a frequency domain, each subframe consisting of 14·2μ OFDM symbols, but the present disclosure is not limited thereto.

In the NR system, a transmitted signal is described by one or more resource grids, consisting of $N_{RB}^\mu N_{sc}^{RB}$ subcarriers, and $2^\mu N_{symb}^{(\mu)}$ OFDM symbols, where $N_{RB}^\mu \leq N_{RB}^{max,\mu}$. $N_{RB}^{max,\mu}$ denotes a maximum transmission bandwidth and may change not only between numerologies but also between uplink and downlink.

In this case, as illustrated in FIG. 5, one resource grid may be configured per numerology μ and antenna port p.

FIG. 5 illustrates examples of a resource grid per antenna port and numerology to which a method proposed in the present disclosure is applicable.

Each element of the resource grid for the numerology μ and the antenna port p is called a resource element and is uniquely identified by an index pair (k,l), where k=0, . . . , $N_{RB}^{\mu} N_{sc}^{RB}-1$ is an index on a frequency domain, and l=0, . . . , $2^{\mu} N_{symb}^{\mu}-1$ refers to a location of a symbol in a subframe. The index pair (k,l) is used to refer to a resource element in a slot, where l=0, . . . , $N_{symb}^{\mu}-1$.

The resource element (k,l) for the numerology P and the antenna port p corresponds to a complex value $a_{k,l}^{(p,\mu)}$. When there is no risk for confusion or when a specific antenna port or numerology is not specified, the indexes p and μ may be dropped, and as a result, the complex value may be $a_{k,l}^{(p)}$ or $a_{k,l}$.

Further, a physical resource block is defined as $N_{sc}^{RB}=1$ consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2.

absoluteFrequencyPointA represents frequency-location of the point A expressed as in absolute radio-frequency channel number (ARFCN).

The common resource blocks are numbered from 0 and upwards in the frequency domain for subcarrier spacing configuration μ.

The center of subcarrier 0 of common resource block 0 for the subcarrier spacing configuration μcoincides with 'point A'. A common resource block number $n_{CRB}^{\mu}$ in the frequency domain and resource elements (k, l) for the subcarrier spacing configuration μ may be given by the following Equation 1.

$$n_{CRB}^{\mu} = \left\lfloor \frac{k}{N_{sc}^{RB}} \right\rfloor \quad \text{[Equation 1]}$$

Here, k may be defined relative to the point A so that k=0 corresponds to a subcarrier centered around the point A. Physical resource blocks are defined within a bandwidth part (BWP) and are numbered from 0 to $N_{BWP,i}^{size}-1$, where i is No. of the BWP. A relation between the physical resource block $n_{PRB}$ in BWP i and the common resource block $n_{CRB}$ may be given by the following Equation 2.

$$n_{CRB}=n_{PRB}+N_{BWP,i}^{start} \quad \text{[Equation 2]}$$

Here, $N_{BWP,i}^{start}$ may be the common resource block where the BWP starts relative to the common resource block 0.

Bandwidth Part (BWP)

In the NR system, up to 400 MHz can be supported per component carrier (CC). If the UE operating in the wideband CC always operates with RF on the entire CC turned on, the battery consumption of the UE may increase. Alternatively, considering various use cases (e.g., eMBB, URLLC, mMTC, V2X, and the like) operating in one wideband CC, different numerologies (e.g., sub-carrier spacing) may be supported for each frequency band in the corresponding CC.

Alternatively, the maximum bandwidth capability may be different for each UE. In consideration of this, the base station may instruct the UE to operate only in a partial bandwidth rather than the entire bandwidth of the wideband CC, and the corresponding partial bandwidth is defined as a bandwidth part (BWP) for convenience. The BWP may be composed of contiguous resource blocks (RBs) on the frequency axis, and may correspond to one numerology (e.g., sub-carrier spacing, cyclic prefix (CP) length, slot/mini-slot duration, or the like).

Meanwhile, the base station can set a plurality of BWPs within one CC configured for the UE. For example, in the PDCCH monitoring slot, a BWP occupying a relatively small frequency domain is set, and the PDSCH indicated by the PDCCH may be scheduled on a larger BWP. And/or, when the UEs are concentrated on a specific BWP, some UEs may be set to switch to other BWPs for load balancing. And/or, some area (that is, spectrum) of the entire bandwidth may be excluded and both BWPs may be set in the same slot in consideration of frequency domain inter-cell interference cancellation between neighboring cells and the like. That is, the base station may configure at least one DL/UL BWP to the UE associated with/related to the wideband CC, and specifically, may activate at least one of DL/UL BWP(s) configured at a specific time (L1) (by signaling, or MAC CE or RRC signaling, etc.). And/or, the base station may instruct the UE to switch to another configured DL/UL BWP (via L1 signaling or MAC CE or RRC signaling, etc.). And/or, based on a timer, a method of setting switching to the configured DL/UL BWP when the value of the corresponding timer expires may also be considered.

In this case, the activated DL/UL BWP may be defined or referred to as an active DL/UL BWP. However, in a situation such as before the UE is in the process of initial access or RRC connection is established (i.e., set up), it may not be possible to receive configuration for DL/UL BWP. In this case, the DL/UL BWP assumed by the UE may be defined or referred to as an initial active DL/UL BWP.

For example, when a specific field indicating BWP (e.g., BWP indicator field) is included in DCI (e.g., DCI format 1_1) for scheduling of PDSCH, the value of the corresponding field may be set to indicate a specific DL BWP (e.g., active DL BWP) among a set of DL BWPs (pre-) configured for DL reception for the UE. In this case, the UE receiving the DCI may be configured to receive DL data in a specific DL BWP indicated by the corresponding field. And/or, when a specific field indicating the BWP (e.g., BWP indicator field) is included in DCI (e.g., DCI format 0_1) for scheduling of PUSCH, the value of the corresponding field may be set to indicate a specific UL BWP (e.g., active UL BWP) in a set of UL BWPs (pre-) configured for UL transmission for the UE. In this case, the UE receiving the DCI may be configured to transmit UL data in a specific UL BWP indicated by the corresponding field.

Physical Channel and General Signal Transmission

FIG. 6 illustrates physical channels and general signal transmission used in a 3GPP system. In a wireless communication system, the UE receives information from the eNB through Downlink (DL) and the UE transmits information to the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S601). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S602).

Meanwhile, when there is no radio resource first accessing the eNB or for signal transmission, the UE may perform a Random Access Procedure (RACH) to the eNB (S603 to S606). To this end, the UE may transmit a specific sequence to a preamble through a Physical Random Access Channel (PRACH) (S603 and S605) and receive a response message (Random Access Response (RAR) message) for the preamble through the PDCCH and a corresponding PDSCH. In the case of a contention based RACH, a Contention Resolution Procedure may be additionally performed (S606).

The UE that performs the above procedure may then perform PDCCH/PDSCH reception (S607) and Physical Uplink Shared Channel (PUSCH)/Physical Uplink Control Channel (PUCCH) transmission (S608) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

Meanwhile, the control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information such as the CQI/PMI/RI, etc., through the PUSCH and/or PUCCH.

CSI Related Operation

In a New Radio (NR) system, a channel state information-reference signal (CSI-RS) is used for time and/or frequency tracking, CSI computation, layer 1 (L1)-reference signal received power (RSRP) computation, and mobility. Here, the CSI computation is related to CSI acquisition, and L1-RSRP computation is related to beam management (BM).

Channel state information (CSI) collectively refers to information that may indicate the quality of a radio channel (or referred to as a link) formed between the UE and the antenna port.

FIG. 7 is a flowchart illustrating an example of a CSI related procedure.

Referring to FIG. 7, in order to perform one of usages of the CSI-RS, a terminal (e.g., user equipment (UE)) receives, from a base station (e.g., general Node B or gNB), configuration information related to the CSI through radio resource control (RRC) signaling (step S710).

The configuration information related to the CSI may include at least one of CSI-interference management (IM) resource related information, CSI measurement configuration related information, CSI resource configuration related information, CSI-RS resource related information, or CSI report configuration related information.

The CSI-IM resource related information may include CSI-IM resource information, CSI-IM resource set information, and the like. The CSI-IM resource set is identified by a CSI-IM resource set identifier (ID), and one resource set includes at least one CSI-IM resource. Each CSI-IM resource is identified by a CSI-IM resource ID.

The CSI resource configuration related information may be expressed as CSI-ResourceConfig IE. The CSI resource configuration related information defines a group including at least one of a non-zero power (NZP) CSI-RS resource set, a CSI-IM resource set, or a CSI-SSB resource set. In other words, the CSI resource configuration related information may include a CSI-RS resource set list and the CSI-RS resource set list may include at least one of a NZP CSI-RS resource set list, a CSI-IM resource set list, or a CSI-SSB resource set list. The CSI-RS resource set is identified by a CSI-RS resource set ID, and one resource set includes at least one CSI-RS resource. Each CSI-RS resource is identified by a CSI-RS resource ID.

Table 5 represents an example of NZP CSI-RS resource set IE. As represented in Table 5, parameters (e.g., a BM related 'repetition' parameter and a tracking related 'trs-Info' parameter) representing the usage of CSI-RS may be configured for each NZP CSI-RS resource set.

TABLE 5

```
-- ASN1START
-- TAG-NZP-CSI-RS-RESOURCES-START
NZP-CSI-RS-ResourceSet : :=              SEQUENCE {
    nzp-CSI-ResourceSetId                    NZP-CSI-RS-ResourceSetId,
    nzp-CSI-RS-Resources                     SEQUENCE (SIZE (1..maxNrofNZP-CSI-RS-
ResourcePerSet) ) OF NZP-CSI-RS-ResourceId,
    repetition                               ENUMERATED { on, off }
    aperiodicTriggeringOffset                INTEGER(0..4)
    trs-Info                                 ENUMERATED {true}
    ...
}
-- TAG-NZP-CSI-RS-RESOURCESET-STOP
-- ASN1STOP
```

In addition, the repetition parameter corresponding to the higher layer parameter corresponds to 'CSI-RS-ResourceRep' of L1 parameter.

The CSI report configuration related information includes a reportConfigType parameter representing a time domain behavior and a reportQuantity parameter representing a CSI related quantity for reporting. The time domain behavior may be periodic, aperiodic, or semi-persistent.

The CSI report configuration related information may be expressed as CSI-ReportConfig IE, and Table 6 below represents an example of CSI-ReportConfig IE.

TABLE 6

```
-- ASN1START
-- TAG-CSI-RESOURCECONFIG-START
CSI-ReportConfig : :=                SEQUENCE {
    reportConfigId                   CSI-ReportConfigId,
    carrier                          ServCellIndex           OPTIONAL, -- Need S
    resourceForChannelMeasurement    CSI-ResourceConfigId,
    csi-IM-ResourcesForInterference  CSI-ResourceConfigId    OPTIONAL, -- Need R
    nzp-CSI-RS-ResourcesForInterference  CSI-ResourceConfigId  OPTIONAL, -- Need R
    reportConfigType                 CHOICE {
        periodic                     SEQUENCE {
            reportSlotConfig         CSI-ReportPeriodicityAndOffset,
            pucch-CSI-ResourceList   SEQUENCE (SIZE (1..maxNrofBWPs) ) OF PUCCH-CSI-Resource
        },
        semiPersistantOnPUCCH        SEQUENCE {
            reportSlotConfig         CSI-ReportPeriodicityAndOffset,
            pucch-CSI-ResourceList   SEQUENCE (SIZE (1..maxNrofBWPs) ) OF PUCCH-CSI-Resource
        },
        semiPersistentOnPUSCH        SEQUENCE {
            reportSlotConfig         ENUMERATED {s15, s110, s120, s140, s180, s1160, s1320},
            reportSlotOffsetList     SEQUENCE (SIZE (1.. maxNrofUL-Allocations) ) OF INTEGER (0..32) ,
            p0alpha                  P0-PUSCH-AlphaSetId
        },
        aperiodic                    SEQUENCE {
            reportSlotOffsetList     SEQUENCE (SIZE (1..maxNrofUL-Allocations) ) OF INTEGER (0..32)
        }
    },
    reportQuantity                   CHOICE {
        none                         NULL,
        cri-RI-PMI-CQI               NULL,
        cri-RI-i1                    NULL,
        cri-RI-i1-CQI                SEQUENCE {
            pdsch-BundleSizeForCSI   ENUMERATED {n2, n4}    OPTIONAL
        },
        cri-RI-CQI                   NULL,
        cri-RSRP                     NULL,
        ssb-Index-RSRP               NULL,
        cri-RI-LI-PMI-CQI            NULL
    },
```

The UE measures CSI based on configuration information related to the CSI (step S720). The CSI measurement may include (1) a CSI-RS reception process of the UE (step S721) and (2) a process of computing the CSI through the received CSI-RS (step S722), and a detailed description thereof will be described below.

For the CSI-RS, resource element (RE) mapping of a CSI-RS resource is configured time and frequency domains by higher layer parameter CSI-RS-ResourceMapping.

Table 7 represents an example of CSI-RS-ResourceMapping IE.

TABLE 7

```
-- ASN1START
-- TAG-CSI-RS-RESOURCEMAPRING-START
CSI-RS-ResourceMapping ::=    SEQUENCE {
    frequencyDomainAllocation    CHOICE {
        row1                         BIT STRING (SIZE (4) ),
        row2                         BIT STRING (SIZE (12) ),
        row4                         BIT STRING (SIZE (3) ),
        other                        BIT STRING (SIZE (6) )
    },
    nrofPorts                    ENUMERATED {p1,p2,p4,p8,p12,p16,p24,p32},
    firstOFDMSymbolInTimeDomain  INTEGER (0..13),
    firstOFDMSymbolInTimeDomain2 INTEGER (2..12)
    cdm-Type                     ENUMERATED {noCDM, fd-CDM2, cdm4-FD2-TD2, cdm8-
FD2-TD4},
    density                      CHOICE {
        dot5                         ENUMERATED {evenPRBs, oddPRBs},
        one                          NULL,
        three                        NULL,
        spare                        NULL
    },
    freqBand                     CSI-FrequencyOccupation,
    ...
}
```

In Table 7, a density (D) represents a density of the CSI-RS resource measured in RE/port/physical resource block (PRB), and nrofPorts represents the number of antenna ports.

The UE reports the measured CSI to the BS (step S730).

Here, in the case that a quantity of CSI-ReportConfig of Table 7 is configured to 'none (or No report)', the UE may skip the report.

However, even in the case that the quantity is configured to 'none (or No report)', the UE may report the measured CSI to the BS.

The case where the quantity is configured to 'none (or No report)' is a case of triggering aperiodic TRS or a case where repetition is configured.

Here, only in the case where the repetition is configured to 'ON', the report of the UE may be skipped.

CSI Measurement

The NR system supports more flexible and dynamic CSI measurement and reporting. Here, the CSI measurement may include a procedure of acquiring the CSI by receiving the CSI-RS and computing the received CSI-RS.

As time domain behaviors of the CSI measurement and reporting, aperiodic/semi-persistent/periodic channel measurement (CM) and interference measurement (IM) are supported. A 4 port NZP CSI-RS RE pattern is used for configuring the CSI-IM.

CSI-IM based IMR of the NR has a similar design to the CSI-IM of the LTE and is configured independently of ZP CSI-RS resources for PDSCH rate matching. In addition, in NZP CSI-RS based IMR, each port emulates an interference layer having (a preferable channel and) precoded NZP CSI-RS. This is for intra-cell interference measurement with respect to a multi-user case and primarily targets MU interference.

The BS transmits the precoded NZP CSI-RS to the UE on each port of the configured NZP CSI-RS based IMR.

The UE assumes a channel/interference layer for each port and measures interference.

In respect to the channel, when there is no PMI and RI feedback, multiple resources are configured in a set, and the BS or the network indicates a subset of NZP CSI-RS resources through the DCI with respect to channel/interference measurement.

Resource setting and resource setting configuration will be described in more detail.

Resource Setting

Each CSI resource setting 'CSI-ResourceConfig' includes a configuration for S≥1 CSI resource set (given by higher layer parameter csi-RS-ResourceSetList). The CSI resource setting corresponds to the CSI-RS-resourcesetlist. Here, S represents the number of configured CSI-RS resource sets. Here, the configuration for S≥1 CSI resource set includes each CSI resource set including CSI-RS resources (constituted by NZP CSI-RS or CSI IM) and an SS/PBCH block (SSB) resource used for L1-RSRP computation.

Each CSI resource setting is positioned in a DL BWP (bandwidth part) identified by a higher layer parameter bwp-id. In addition, all CSI resource settings linked to CSI reporting setting have the same DL BWP.

A time domain behavior of the CSI-RS resource within the CSI resource setting included in CSI-ResourceConfig IE is indicated by higher layer parameter resourceType and may be configured to be aperiodic, periodic, or semi-persistent. The number S of configured CSI-RS resource sets is limited to '1' with respect to periodic and semi-persistent CSI resource settings. Periodicity and slot offset which are configured are given in numerology of associated DL BWP as given by bwp-id with respect to the periodic and semi-persistent CSI resource settings.

When the UE is configured as multiple CSI-ResourceConfigs including the same NZP CSI-RS resource ID, the same time domain behavior is configured with respect to CSI-ResourceConfig.

When the UE is configured as multiple CSI-ResourceConfigs including the same CSI-IM resource ID, the same time domain behavior is configured with respect to CSI-ResourceConfig.

Next, one or more CSI resource settings for channel measurement (CM) and interference measurement (IM) are configured through higher layer signaling.

CSI-IM resource for interference measurement.
NZP CSI-RS resource for interference measurement.
NZP CSI-RS resource for channel measurement.

That is, channel measurement resource (CMR) may be NZP CSI-RS and interference measurement resource (IMR) may be NZP CSI-RS for CSI-IM and IM.

Here, CSI-IM (or ZP CSI-RS for IM) is primarily used for inter-cell interference measurement.

In addition, NZP CSI-RS for IM is primarily used for intra-cell interference measurement from multi-users.

The UE may assume CSI-RS resource(s) for channel measurement and CSI-IM/NZP CSI-RS resource(s) for interference measurement configured for one CSI reporting are 'QCL-TypeD' for each resource.

Resource Setting Configuration

As described, the resource setting may mean a resource set list.

In each trigger state configured by using higher layer parameter CSI-AperiodicTriggerState with respect to aperiodic CSI, each CSI-ReportConfig is associated with/related to one or multiple CSI-Reportconfigs linked to the periodic, semi-persistent, or aperiodic resource setting.

One reporting setting may be connected with a maximum of three resource settings.

When one resource setting is configured, the resource setting (given by higher layer parameter resourcesForChannelMeasurement) is used for channel measurement for L1-RSRP computation.

When two resource settings are configured, a first resource setting (given by higher layer parameter resourcesForChannelMeasurement) is used for channel measurement and a second resource setting (given by csi-IM-ResourcesForInterference or nzp-CSI-RS-ResourcesForInterference) is used for interference measurement performed on CSI-IM or NZP CSI-RS.

When three resource settings are configured, a first resource setting (given by resourcesForChannelMeasurement) is for channel measurement, a second resource setting (given by csi-IM-ResourcesForInterference) is for CSI-IM based interference measurement, and a third resource setting (given by nzp-CSI-RS-ResourcesForInterference) is for NZP CSI-RS based interference measurement.

Each CSI-ReportConfig is linked to periodic or semi-persistent resource setting with respect to semi-persistent or periodic CSI.

When one resource setting (given by resourcesForChannelMeasurement) is configured, the resource setting is used for channel measurement for L1-RSRP computation.

When two resource settings are configured, a first resource setting (given by resourcesForChannelMeasurement) is used for channel measurement and a second resource setting (given by higher layer parameter csi-IM-ResourcesForInterference) is used for interference measurement performed on CSI-IM.

CSI Computation

When interference measurement is performed on CSI-IM, each CSI-RS resource for channel measurement is associated with/related to the CSI-IM resource for each resource by an order of CSI-RS resources and CSI-IM resources within a corresponding resource set. The number of CSI-RS resources for channel measurement is equal to the number of CSI-IM resources.

In addition, when the interference measurement is performed in the NZP CSI-RS, the UE does not expect to be configured as one or more NZP CSI-RS resources in the associated resource set within the resource setting for channel measurement.

A UE in which Higher layer parameter nzp-CSI-RS-ResourcesForInterference is configured does not expect that 18 or more NZP CSI-RS ports will be configured in the NZP CSI-RS resource set.

For CSI measurement, the UE assumes the followings.

Each NZP CSI-RS port configured for interference measurement corresponds to an interference transport layer.

In all interference transport layers of the NZP CSI-RS port for interference measurement, an energy per resource element (EPRE) ratio is considered.

Different interference signals on RE(s) of the NZP CSI-RS resource for channel measurement, the NZP CSI-RS resource for interference measurement, or CSI-IM resource for interference measurement.

CSI Reporting

For CSI reporting, time and frequency resources which may be used by the UE are controlled by the BS.

The channel state information (CSI) may include at least one of a channel quality indicator (CQI), a precoding matrix indicator (PMI), a CSI-RS resource indicator (CRI), an SS/PBCH block resource indicator (SSBRI), a layer indicator (LI), a rank indicator (RI), and L1-RSRP.

For the CQI, PMI, CRI, SSBRI, LI, RI, and L1-RSRP, the UE is configured by a higher layer as N≥1 CSI-ReportConfig reporting setting, M≥1 CSI-ResourceConfig resource setting, and a list (provided by aperiodicTriggerStateList and semiPersistentOnPUSCH) of one or two trigger states. In the aperiodicTriggerStateList, each trigger state includes the channel and an associated CSI-ReportConfigs list optionally indicating resource set IDs for interference. In the semiPersistentOnPUSCH-TriggerStateList, each trigger state includes one associated CSI-ReportConfig.

In addition, the time domain behavior of CSI reporting supports periodic, semi-persistent, and aperiodic.

i) The periodic CSI reporting is performed on short PUCCH and long PUCCH. The periodicity and slot offset of the periodic CSI reporting may be configured as RRC and refer to the CSI-ReportConfig IE.

ii) Semi-periodic (SP) CSI reporting is performed on short PUCCH, long PUCCH, or PUSCH.

In the case of SP CSI on the short/long PUCCH, the periodicity and the slot offset are configured as the RRC and the CSI reporting to separate MAC CE/DCI is activated/deactivated.

In the case of the SP CSI on the PUSCH, the periodicity of the SP CSI reporting is configured through the RRC, but the slot offset is not configured through the RRC, and the SP CSI reporting is activated/deactivated by DCI (format 0_1). Separated RNTI (SP-CSI C-RNTI) is used with respect to the SP CSI reporting on the PUSCH.

An initial CSI reporting timing follows a PUSCH time domain allocation value indicated in the DCI and a subsequent CSI reporting timing follows a periodicity configured through the RRC.

DCI format 0_1 may include a CSI request field and may activate/deactivate a specific configured SP-CSI trigger state. The SP CSI reporting has the same or similar activation/deactivation as a mechanism having data transmission on SPS PUSCH.

iii) The aperiodic CSI reporting is performed on the PUSCH and is triggered by the DCI. In this case, information related to trigger of aperiodic CSI reporting may be transferred/indicated/configured through MAC-CE.

In the case of AP CSI having AP CSI-RS, an AP CSI-RS timing is configured by the RRC and a timing for AP CSI reporting is dynamically controlled by the DCI.

The NR does not adopt a scheme (for example, transmitting RI, WB PMI/CQI, and SB PMI/CQI in order) of dividing and reporting the CSI in multiple reporting instances applied to PUCCH based CSI reporting in the LTE. Instead, the NR restricts specific CSI reporting not to be configured in the short/long PUCCH and a CSI omission rule is defined. In addition, in relation with the AP CSI reporting timing, a PUSCH symbol/slot location is dynamically indicated by the DCI. In addition, candidate slot offsets are configured by the RRC. For the CSI reporting, slot offset(Y) is configured for each reporting setting. For UL-SCH, slot offset K2 is configured separately.

Two CSI latency classes (low latency class and high latency class) are defined in terms of CSI computation complexity. The low latency CSI is a WB CSI that includes up to 4 ports Type-I codebook or up to 4-ports non-PMI feedback CSI. The high latency CSI refers to CSI other than the low latency CSI. For a normal UE, (Z, Z') is defined in a unit of OFDM symbols. Here, Z represents a minimum CSI processing time from the reception of the aperiodic CSI triggering DCI to the execution of the CSI reporting. Further, Z' represents a minimum CSI processing time from the reception of the CSI-RS for channel/interference to the execution of the CSI reporting.

Additionally, the UE reports the number of CSIs which may be simultaneously calculated.

Table 8 below is related to the CSI reporting configuration defined in TS38.214.

TABLE 8

5.2.1.4 Reporting configurations

The UE shall calculate CSI parameters (if reported) assuming the following dependencies between CSI parameters (if reported)
LI shall be calculated conditioned on the reported CQI, PMI, RI and CRI
CQI shall be calculated conditioned on the reported PMI, RI and CRI
PMI shall be calculated conditioned on the reported RI and CRI
RI shall be calculated conditioned on the reported CRI.
The Reporting configuration for CSI can be aperiodic (using PUSCH), periodic (using PUCCH) or semi-persistent (using PUCCH, and DCI activated PUSCH). The CSI-RS Resources can be periodic, semi-persistent, or aperiodic. Table 5.2.1.4-1 shows the supported combinations of CSI Reporting configurations and CSI-RS Resource configurations and how the CSI Reporting is triggered for each CSI-RS Resource configuration. Periodic CSI-RS is configured by higher layers. Semi-persistent CSI-RS is activated and deactivated as described in Subclause 5.2.1.5.2. Aperiodic CSI-RS is configured and triggered/activated as described in Subclause 5.2.1.5.1.

Table 5.2.1.4-1:
Triggering/Activation of CSI Reporting for the possible CSI-RS Configurations.

| CSI-RS Configuration | Periodic CSI Reporting | Semi-Persistent CSI Reporting | Aperiodic CSI Reporting |
|---|---|---|---|
| Periodic CSI-RS | No dynamic triggering/activation | For reporting on PUCCH, the UE receives an activation command [10, TS 38.321]; for reporting on PUSCH, the UE receives triggering on DCI | Triggered by DCI: additionally, activation command [10, TS 38.321] possible as defined in Subclause 5.2.1.5.1. |
| Semi-Persistent CSI-RS | Not Supported | For reporting on PUCCH, the UE receives an activation command [10, TS 38.321]; for reporting on PUSCH, the UE receives triggering on DCI | Triggered by DCI; additionally, activation command [10, TS 38.321] possible as defined in Subclause 5.2.1.5.1. |
| Aperiodic CSI-RS | Not Supported | Not Supported | Triggered by DCI; additionally, activation command [10, TS 38.321] possible as defined in Subclause 5.2.1.5.1. |

In addition, Table 9 below is information related to activation/deactivation/trigger by MAC-CE related to Semi-Persistent/Aperiodic CSI reporting defined in TS38.321.

TABLE 9

5.18.2 Activation/Deactivation of Semi-persistent CSI-RS/CSI-IM resource set
The network may activate and deactivate the configured Semi-persistent CSI-RS/CSI-IM resource sets of a Serving Cell by sending the SP CSI-RS/CSI-IM Resource Set Activation/Deactivation MAC CE described in subclause 6.1.3.12 The configured Semi-persistent CSI-RS/CSI-IM resource sets are initially deactivated upon configuration and after a handover.
The MAC entity shall:
    1> if the MAC entity receives an SP CSI-RS/CSI-IM Resource Set Activation/Deactivation
        MAC CE on a Serving Cell:
        2> indicate to lower layers the information regarding the SP CSI-RS/CSI-IM Resource Set
        Activation/Deactivation MAC CE.
5.18.3 Aperiodic CSI Trigger State subselection
The network may select among the configured aperiodic CSI trigger states of a Serving Cell by sending the Aperiodic CSI Trigger State Subselection MAC CE described in subclause 6.1.3.13.
The MAC entity shall:
    1> if the MAC entity receives an Aperiodic CSI trigger State Subselection MAC CE on a Serving
        Cell:
        2> indicate to lower layers tire information regarding Aperiodic CSI trigger State Subselection
        MAC CE.

CSI Reporting Using PUSCH

Aperiodic CSI reporting performed in PUSCH supports broadband and sub-band frequency segmentation. The aperiodic CSI reporting performed in the PUSCH supports Type I and Type II CSI.

SP CSI reporting for PUSCH supports type I and type II CSI having wide band and subband frequency granularity. The PUSCH resource and modulation and coding scheme (MCS) for the SP CSI reporting are semi-permanently allocated by UL DCI.

CSI reporting for PUSCH may include part 1 and part 2. Part 1 is used to identify the number of information bits in Part 2. Part 1 is fully delivered before Part 2.

In relation to type I CSI feedback, Part 1 includes (if reported) RI, (if reported) CRI, and CQI of the first codeword. Part 2 includes PMI, and when RI>4, Part 2 includes CQI.

For Type II CSI feedback, Part 1 has a fixed payload size and includes an indication (NIND) indicating the number of non-zero wideband amplitude coefficients for each layer of RI, CQI and Type II CSI. The part 2 includes the PMI of the Type II CSI. Part 1 and 2 are encoded independently.

When CSI reporting includes two parts in PUSCH and the CSI payload is smaller than the payload size provided by the PUSCH resource allocated for CSI reporting, the UE may omit part of the second CSI. Omission of Part 2 CSI is determined according to priorities shown in Table 10, and priority 0 is the highest priority and $2N_{Rep}$ is the lowest priority. Here, NRep denotes the number of CSI reportings in one slot.

TABLE 10

Priority 0:
Part 2 wideband CSI for CSI reports 1 to $N_{Rep}$
Priority 1:
Part 2 subband CSI of even subbands for CSI report 1
Priority 2:
Part 2 subband CSI of odd subbands for CSI report 1
Priority 3:
Part 2 subband CSI of even subbands for CSI report 2
Priority 4:
Part 2 subband CSI of odd subbands for CSI report 2

TABLE 10-continued

.
.
Priority $2N_{Rep}$-1:
Part 2 subband CSI of even subbands for CSI report $N_{Rep}$
Priority $2N_{Rep}$:
Part 2 subband CSI of odd subbands for CSI report $N_{Rep}$ When Part 2 CSI information for a specific priority level is omitted, the UE omits all information of the corresponding priority level.

When the UE is scheduled to transmit a transport block on PUSCH multiplexed with CSI reporting, Part 2 CSI is omitted only when the UCI code rate for transmitting all Part 2 is greater than the threshold code rate $$c_T = \frac{c_{MCS}}{\beta_{offset}^{CSI-2}}.$$

Here, $c_{MCS}$ denotes a target PUSCH code rate, and $\beta_{offset}^{CSI-2}$ denotes a CSI offset value.

Part 2 CSI is omitted level by level, starting with the lowest-priority level and the lowest-priority level until the UCI code ratio is less than or equal to $c_T$.

When part 2 CSI is transmitted on PUSCH without a transport block, the lower priority bit is omitted until the part 2 CSI code ratio is less than a threshold code rate $$c_T = \frac{\beta_{offset}^{CSI-part1}}{\beta_{offset}^{CSI-part2}} \cdot r_{CSI-1}$$

lower than 1. Here, $\beta_{offset}^{CSI-part1}$ and $\beta_{offset}^{CSI-part2}$ denotes a CSI offset value, and $r_{CSI-1}$ is based on a code rate calculated by the UE or signaled by DCI.

CSI Reporting Using PUCCH

The UE may be configured with a number of periodic CSI reporting corresponding to the CSI reporting configuration indication configured with one or more higher layers. Here, the associated CSI measurement link and CSI resource configuration are configured as a higher layer.

In PUCCH formats 2, 3, or 4, periodic CSI reporting supports type I CSI based on a wide bandwidth.

Regarding the SP CSI on the PUSCH, the UE performs SP CSI reporting for the PUCCH in slot $n+3N_{slot}^{subframe,\mu}+1$ after the HARQ-ACK corresponding to the PDSCH carrying the selection command is transmitted in a slot n.

The selection command includes one or more report setting indications in which the associated CSI resource settings are configured.

In the PUCCH, the SP CSI report supports the Type I CSI.

The SP CSI report of PUCCH format 2 supports type I CSI with wide bandwidth frequency granularity. In the PUCCH format 3 or 4, the SP CSI report supports the type I subband CSI and type II CSI with the wideband frequency granularity.

When PUCCH carries type I CSI with wide bandwidth frequency granularity, the CSI payload carried by PUCCH format 2 and PUCCH format 3 or 4 is the same as CRI (when reported) regardless of RI.

In PUCCH format 3 or 4, the type I CSI subband payload is divided into two parts.

The first part (Part 1) includes the RI, (reported) CRI and (reported) CQI of the first code word. The second part (Part 2) includes the PMI, and when RI>4, the second part (Part 2) includes the CQI of the second code word.

SP CSI reporting performed in PUCCH format 3 or 4 supports type II CSI feedback, but only supports part 1 of type II CSI feedback.

In PUCCH format 3 or 4 supporting type II CSI feedback, CSI reporting may depend on UE performance.

Type II CSI reporting delivered in PUCCH format 3 or 4 (of which only Part 1 is applicable) is calculated independently of type II CSI reporting performed in PUSCH.

When the UE is configured with the CSI reporting in the PUCCH format 2, 3 or 4, each PUCCH resource is configured for each candidate UL BWP.

When the UE receives the active SP CSI reporting configuration on the PUCCH and does not receive a deactivation command, the CSI reporting is performed when the CSI reported BWP is the active BWP, otherwise the CSI reporting is temporarily stopped. This operation also applies to the case of SP CSI of PUCCH. For PUSCH-based SP CSI reporting, the corresponding CSI reporting is automatically deactivated when BWP switching occurs.

According to the length of PUCCH transmission, the PUCCH format may be classified into a short PUCCH or a long PUCCH. The PUCCH formats 0 and 2 may be referred to as short PUCCHs, and the PUCCH formats 1, 3 and 4 may be referred to as long PUCCHs.

With respect to the PUCCH-based CSI reporting, the short PUCCH-based CSI reporting and the long PUCCH-based CSI reporting will be described in detail below.

The short PUCCH-based CSI reporting is used only for wideband CSI reporting. The short PUCCH-based CSI reporting has the same payload regardless of the RI/CRI of the given slot to avoid blind decoding.

The size of the information payload may be different between the maximum CSI-RS ports of the CSI-RS configured in the CSI-RS resource set.

When the payload including PMI and CQI is diversified to include RI/CQI, a padding bit is added to RI/CRI/PMI/CQI before the encoding procedure for equalizing the payload associated with/related to different RI/CRI values. In addition, RI/CRI/PMI/CQI may be encoded with a padding bit if necessary.

In the case of the wideband reporting, the long PUCCH-based CSI reporting may use the same solution as the short PUCCH-based CSI reporting.

The long PUCCH-based CSI reporting uses the same payload regardless of RI/CRI. For subband reporting, two-part encoding (for type I) is applied.

Part 1 may have a fixed payload according to the number of ports, CSI type, RI limitation, etc., and Part 2 may have various payload sizes according to Part 1.

The CSI/RI may be encoded first to determine the payload of PMI/CQI. In addition, CQIi (i=1,2) corresponds to the CQI for the i-th code word (CW).

For the long PUCCH, Type II CSI report may convey only Part 1.

The above contents (e.g., 3GPP system, CSI-related operation, etc.) may be applied in combination with the methods proposed in the present disclosure, or may be supplemented to clarify technical characteristics of the methods proposed in the present disclosure. In addition, in the present disclosure, '/' may mean including (and) all of the content separated by/or include only a part of the separated content (or). In addition, in the present disclosure, the following terms are used uniformly for convenience of explanation <Type II CSI Codebook-Based CSI Reporting Related Content>

In the above-described wireless communication environment, for accurate and efficient channel state information (channel state information, CSI, hereinafter CSI) feedback in terms of feedback overhead, high-resolution feedback methods such as linear combination (LC) and covariance matrix feedback are being considered. In particular, in the NR (New RAT) system, Type II CSI feedback considers the 'DFT-based compression' method described in Table 11 as a method of combining beams (e.g., combining beams based on amplitude and/or phase) in a subband (SB)-wide width with respect to $W_1$ composed of L orthogonal DFT beams corresponding to wideband (WB) information.

Table 11 shows an example of a DFT-based compression scheme from the viewpoint of reducing CSI reporting overhead based on the Type II CSI codebook of rank 1-2.

TABLE 11

| DFT-based compression |
|---|
| - Precoders for a layer is given by size-P × N$_3$ matrix W = W$_1$W̃$_2$W$_f^H$ <br>    - P = 2N$_1$N$_2$ = #SD dimensions <br>    - N$_3$ = #FD dimensions <br>      - FFS value and unit of N$_3$ <br>    - Precoder normalization; the precoding matrix for given rank and unit of N$_3$ is normalized to norm 1/sqrt(rank) <br> - Spatial domain (SD) compression <br>    - L spatial domain basis vectors (mapped to the two polarizations so 2L in total) selected <br><br>      Compression in spatial domain using $W_1 = \begin{bmatrix} v_0 v_1 \cdots v_{L-1} & 0 \\ 0 & v_0 v_1 \cdots v_{L-1} \end{bmatrix}$, where |

TABLE 11-continued

DFT-based compression $\{v_i\}_{i=0}^{L-1}$ are $N_1 N_2 \times 1$ orthogonal DFT vectors (same as Rel. 15 Type II)
- Frequency-domain (FD) compression Compression via $W_f = [W_f(0), \cdots, W_f(2L-1)]$ where $W_f(i) = \left[f_{k_{i,0}} f_{k_{i,1}} \cdots f_{k_{i,M_i-1}}\right]$, where $\{f_{k_{i,m}}\}_{m=0}^{M_i-1}$ are $M_i$ size-$N_3 \times 1$ orthogonal DFT vectors for SD-component
    $i = 0, \ldots, 2L - 1$
- Number of FD-components $\{M_i\}$ or $\Sigma_{i=0}^{2L-1} M_i$ is configurable, FFS value range
- FFS: choose one of the following alternatives
  - Alt1. common basis vectors: $W_f = [f_{k_0} f_{k_1} \ldots f_{k_{M-1}}]$, i.e. $M_i = M \; \forall i$ and
    $\{k_{i,m}\}_{m=0}^{M_i-1}$ are identical (i.e., $k_{i,m} = k_m$, $i = 0, \ldots, 2L - 1$)
  - Alt2. independent basis vectors: $W_f = [W_f(0), \ldots, W_f(2L-1)]$, where $W_f(i) =$ $\left[f_{k_{i,0}} f_{k_{i,1}} \cdots f_{k_{i,M_i-1}}\right]$, i.e. $M_i$ frequency-domain components (per SD-component)

are selected
  - Note: $\{k_m\}_{m=0}^{M-1}$ or $\{k_{i,m}\}_{m=0}^{M_i-1}$, $i = 0, \ldots, 2L - 1$ are all selected from the index set
    $\{0, 1, \ldots, N_3 - 1\}$ from the same orthogonal basis group
- FFS: If oversampled DFT basis or DCT basis is used instead of orthogonal DFT basis
- FFS: Same or different FD-basis selection across layers
- Linear combination coefficients (for a layer)
  FFS if $\tilde{W}_2$ is composed of $K = 2LM$ or $K = \Sigma_{i=0}^{2L-1} M_i$ linear combination coefficients
  - FFS if only a subset $K_0 < K$ of coefficients are reported (coefficients not reported are zero).
  - FFS if layer compression is applied so that $\Sigma_{i=0}^{2L-l-1} M_i$ transformed coefficients are used to
    construct $\tilde{W}_2$ for layer $l$ (where the transformed coefficients are the reported quantity)
  - FFS quantization/encoding/reporting structure
  - Note: The terminology "SD-compression" and "FD-compression" are for discussion
    purposes only and are not intended to be captured in the specification In addition, a method of extending the DFT-based compression method to the case of RI=3-4 is also being considered. A method of determining the number of non-zero (NZ) coefficients for each layer may be selected from the following examples (Alt 0/Alt1), in conjunction with the agreement that the maximum number of total non-zero (NZ) coefficients across all layers can be less than or equal to $2K_0$ (where $K_0$ value (i.e., beta $\beta$) is set for RI∈ $\{1,2\}$).

Alt0. $K_{NZ,i}$ is unrestricted as long as $\Sigma_{i=0}^{RI-1} K_{NZ,i} \leq 2K_0$
Alt1. $K_{NZ,i} \leq K0$ is unrestricted as long as $\Sigma_{i=0}^{RI-1} K_{NZ,i} \leq 2K_0$ When the parameter $p=v_0$ for RI=3-4 is set as a higher layer in conjunction with the parameter $p=v_0$ for RI=1-2, Table 12 below may be supported.

The parameter $(y_0, v_0)$ may be selected from $$\left\{\left(\frac{1}{2}, \frac{1}{4}\right), \left(\frac{1}{4}, \frac{1}{4}\right), \left(\frac{1}{4}, \frac{1}{8}\right)\right\}.$$

TABLE 12

| RI | Layer | L | p |
|----|-------|-----|-----|
| 1  | 0     | $x_0$ | $y_0$ |
| 2  | 0     |     |     |
|    | 1     |     |     |
| 3  | 0     |     | $v_0$ |
|    | 1     |     |     |
|    | 2     |     |     |
| 4  | 0     |     |     |
|    | 1     |     |     |
|    | 2     |     |     |
|    | 3     |     |     |

The above description refers to expressing channel information by using a basis such as DFT or a codebook for spatial domain (SD) and frequency domain (FD) information of CSI. The size of the reported total feedback is affected by the number of beams to be combined, the amount of quantization for combining coefficients, the size of a subband, etc., and in CSI feedback, most of the payload is generated when the UE reports information of $\tilde{w}_2$ to the base station. Here, $\tilde{w}_2$ is composed of linear combination coefficients for the SD/FD codebook in the DFT-based compression scheme, and may be represented by a matrix of a size of 2L×M.

In particular, when the rank exceeds 1, it is necessary to separately designate the SD/FD compression codebook for each layer, or even if the same codebook is applied to all layers, since channel information is configured in the overlapping sum $\tilde{w}_2$ of SD and FD for each layer of the codebook, as the rank increases, the channel state information that needs to be fed back also increases linearly.

In NR, conventionally, in the case of the CSI feedback of the single base station and the UE, such as the CSI reporting using the PUSCH, the CSI component (or parameter) is divided into part 1 and part 2 so that it can be transmitted based on the feedback resource capacity allocated to the UCI, and by omitting channel state information according to a priority level within each part, it was possible to satisfy the requirement for the amount of UE CSI feedback resources.

However, unlike the conventional method of reporting the linear combining (LC) coefficients for the spatial domain beam for each subband (SB), the enhanced Type II CSI codebook newly considered in NR is used in the frequency domain for the corresponding subbands. Therefore, since it is impossible to directly reuse the existing CSI omission operation, the CSI omission method needs to be newly considered according to the CSI codebook design.

<UCI Parameter Related Content>

UCI constituting the Type II CSI reporting may include parameters as shown in Table 13.

Table 13 shows examples of parameters constituting UCI part 1 and part 2. UCI part 1 may mean part 1 CSI, and UCI part 2 may mean part 2 CSI.

TABLE 13

| Parameter | Location | Details/description |
|---|---|---|
| RI | UCI part 1 | $RI \in \{1, \ldots, RI_{MAX}\}$ |
| # NZ coefficients | UCI part 1 | # NZC summed across layers, $K_{NZ,TOT} \in \{1, 2, \ldots, 2K_0\}$ |
| Wideband CQI | UCI part 1 | Same as R15 |
| Subband CQI | UCI part 1 | Same as R15 |
| Bitmap per layer | UCI part 2 | RI = 1-2: for layer l, size-2LM<br>RI = 3-4: for layer l, size-$2LM_i$-1 |
| Strongest coefficient indicator (SCI) | UCI part 2 | |
| SD basis subset selection indicator | UCI part 2 | Layer-common with combinatorial indicator |
| FD basis subset selection indicator | UCI part 2 | |
| LC coefficients: phase | UCI part 2 | Quantized independently across layers |
| LC coefficients: amplitude | UCI part 2 | Quantized independently across layers (including reference amplitude for weaker polarization, for each layer) |
| SD oversampling (rotation) factor $q_1$, $q_2$ | UCI part 2 | Values of $q_1$, $q_2$ follow Rel.15 |

Each parameter constituting UCI will be described $RI(\in \{1, \ldots, RI_{max}\})$ and $K_{NZ,TOT}$ (the total number of non-zero coefficients summed across all the layers, where $K_{NZ,TOT} \in \{1, 2, \ldots, 2K_0\}$ is reported in UCI part 1.

In RI=3-4, the bitmaps, each of which size is $2LM_i$ (i=0,1, ..., RI−1, where i represents the i-th layer), are reported in UCI part 2.

The following FD basis subset selection schemes are supported:

In $N_3 \leq 19$, one-step free selection is used.

In $N_3 > 19$ the window-based IntS and fully parameterized $M_{initial}$ indicate an intermediate set composed of FD bases mod($M_{initial}$+n,$N_3$), n=0,1, ..., $N_3'$−1 $N_3'$=$\lceil \alpha M \rceil$, where $\alpha$ is set as a higher layer from two possible values.

The second step subset selection is indicated by a $X_2$ bit combinatorial indicator (for each layer) in the UCI part 2.

In SCI for RI=1, the strongest coefficient indicator (SCI) is the $\lceil \log_2 K_{NZ} \rceil$-bit indicator.

In SCI of RI>1 (reported within UCI part 2), $SCI_i$ by layer, i.e., is $\lceil \log_2 2L \rceil$-bit (i=0,1, ..., (RI−1)). The positions (indexes) of the strongest LC coefficients of layer i before index remapping are, $SCI_i = l_i^*$, and $m_i^*$ is not reported.

For SCI (RI>1) and FD basis subset selection indicators, the schemes described in Table 14 below are supported

TABLE 14

| | |
|---|---|
| SCI for RI > 1 | Alt3.4: Per-layer SCI, where $SCI_i$ is a $\lceil \log_2 2L \rceil$-bit (i = 0, 1, ... (RI − 1)). The location (index) of the strongest LC coefficient for layer i before index remapping is $(l_i^*, m_i^*)$, $SCI_i = l_i^*$, and $m_i^*$ is not reported |
| Index remapping | For layer i, the index $m_i$ of each nonzero LC coefficient $C_{l_i,m_i}$ is remapped with respect to $m_i^*$ to $\tilde{m}_i$ such that $\tilde{m}_i^* = 0$. The FD basis index $k_{m_i}$ associated to each nonzero LC coefficient $c_{l_i,m_i}$ is remapped with respect to $k_{m_i^*}$ to $\tilde{k}_{m_i}$ such that $\tilde{k}_{m_i^*} = 0$. The sets $\{c_{l_i,\tilde{m}_i} \neq c_{l_i^*,0}\}$ and $\{\tilde{k}_{m_i} \neq 0\}$ are reported. |
| | Informative note (for the purpose of reference procedure):<br>The index $(l_i, m_i)$ of nonzero LC coefficients is remapped as<br>$(l_i, m_i) \to (l_i, (m_i - m_i^*) \mod M_i)$. The codebook index associated with nonzero LC coefficient index $(l_i, m_i)$ is remapped as<br>$k_{m_i} \to (k_{m_i} - k_{m_i^*}) \mod N_3$. |
| Combinatorial indicator for $N_3 \leq 19$ | $\left\lceil \log_2 \binom{N_3 - 1}{M_i - 1} \right\rceil$ bits |
| Combinatorial indicator for $N_3 > 19$ | $\left\lceil \log_2 \binom{N_3' - 1}{M_i - 1} \right\rceil$ −bit |
| $M_{initial}$ | Reported in UCI part 2, details on bitwidth and possible values are FFS |

<CSI Omission Related Content>

When the uplink resources allocated for the UCI are not sufficient for the full CSI reporting, the CSI omission may occur. The CSI omission may be expressed as UCI omission. When the CSI omission (omission) occurs, the selected UCI omission scheme needs to satisfy the following criteria. i) CSI calculation is identical to the case without omission (identical). Otherwise, the UE will eventually recalculate the CSI when UCI omission occurs. When the UCI omission occurs, the related CQI may not be conditionally calculated in PMI after the omission. ii) The occurrence of the UCI omission may be inferred from related CSI reporting without additional signaling. iii) The resulting UCI payload after the omission need not be ambiguous (because of payload ambiguity, the base station needs to perform blind decoding of UCI part 2). iv) When CSI omission occurs, dropping all NZCs associated with/related to any particular layer should not be done.

A non-zero LC coefficient (NZC) associated with/related to the layer $\lambda \in \{0,1,\ldots,RI-1\}$, beam $l \in \{0,1,\ldots,2L-1\}$, and FD basis $m \in \{0,1,\ldots,M-1\}$ may be represented by $c_{l,m}^{(\lambda)}$.

For the purpose of UCI omission, parameters of UCI part 2 may be divided into 3 groups, and group (n) has a higher priority than group (n+1) (n=0, 1).

When the UE is configured to report the $N_{Rep}$ CSI reporting, group 0 includes at least SD rotation factors, SD indicator, and SCI(s) for all $N_{Rep}$ reports. For each of the $N_{Rep}$ reports, group 1 may include at least a reference amplitude(s) for weaker polarization, $\{c_{l,m}^{(\lambda)}, (\lambda,l,m) \in G_1\}$, and an FD indicator. For each of the reports, group 2 includes at least $\{c_{l,m}^{(\lambda)}, (\lambda,l,m) \in G_2\}$. Where G1 and G2 exclude indices related to the strongest coefficient(s).

A priority rule for determining G1 and G2 may be selected from the following Alt1.1 to Alt 1.3:

Alt 1.1: LC coefficients may be prioritized from high priority to low priority according to $(\lambda,l,m)$ (index triplet, $\lceil K_{M2}^{TOT}/2 \rceil$ highest priority coefficients belong to G1, and $\lfloor K_{M2}^{TOT}/2 \rfloor$ lowest priority coefficients belong to G2. A priority level may be calculated according to $Prio(\lambda,l,m) = 2L \cdot RI \cdot Perm_1(n) + RI \cdot Perm_2(l) + \Delta$.

Alt 1.2: non-zero coefficients $c_{l,m}^{(\lambda)}$ are based on $\lambda \to l \to m$ indexing (layer→SD→FD), or C coefficients are sorted sequentially from 0 to KNZ-1 in the order based on $l \to \lambda \to m$ indexing (SD→layer→FD). Group G1 includes at least first $$\frac{K_{NZ}}{2}$$

sorted coefficients, and group G2 includes the remaining second sorted coefficients.

Alt 1.3: LC coefficients may be prioritized from high priority to low priority according to $(\lambda,l,m)$ index triplet. $\lceil K_{M2}^{TOT}/4L \rceil = 2L$ highest priority coefficients belong to G1, and $\lfloor K_{M2}^{TOT}/4L \rfloor = 2L$ lowest priority coefficients belong to G2. A priority level may be calculated according to $Prio(\lambda, l,m) = 2L \cdot RT \cdot Perm_1(m) + RT \cdot Perm_2(l) + \lambda$.

Which group(s) $\beta_{l,m}^{(\lambda)}$ belongs to is selected from the following (Alt 2.1 to Alt 2.6).

Alt 2.1: (only coupled with Alt 1.1), according to $Prio(\lambda, l,m)$, the first $$RL2LM - \frac{K_{NZ}^{TOT}}{2}$$

bits belong to group 1, and according to a $Prio(\lambda,l,m)$ value, the last $$\frac{K_{NZ}^{TOT}}{2}$$

bits belong to group 2.

Alt 2.2: (only coupled with Alt 1.2) Bitmaps and coefficients are segmented into M segments (M=number of FD basis indices). Group 1 contains M1 segments and group 2 contains M2 segments. Here, M=M1+M2.

Each segment includes the bitmap (sub-bitmap) associated with/related to all RI layers, bitmap (sub-bitmap) associated with/related to all the SD components and a single FD component, and corresponding combining coefficients. A payload size of group 1 is given as $$RL2LM + \frac{K_{NZ}^{TOT}}{2} N$$

(N=number of bits for amplitude and phase). A payload size of group 2 is given by $$\frac{K_{NZ}^{TOT}}{2}(a+b).$$

Alt 2.3: (only coupled with Alt 1.3), according to a $Prio(\lambda,l,m)$ value, the first $RI2LM - \lfloor K_{NZ}^{TOT}/4L \rfloor = 2L$ bits belong to group 1, and according to the $Prio(\lambda,l,m)$ value, the last $\lfloor K_{NZ}^{TOT}/4L \rfloor = 2L$ bits belong to group 2.

Alt 2.4: (only coupled with Alt 1.1), according to the $Prio(\lambda,l,m)$ value, the first RI·LM bits belong to group 1, and according to the $Prio(\lambda,l,m)$ value, the last RI·LM belongs to group 2.

Alt2.5: (applicable to any Alt1.x) Bitmaps $\beta_{l,m}^{(\lambda)}$ are included in group 0.

Alt2.6: (applicable to any Alt1.x) Bitmaps $\beta_{l,m}^{(\lambda)}$ are included in group 1.

As described above, the CSI reporting through the PUSCH may be composed of UCI part1 and UCI part2. The UCI part1 includes the number of amplitude coefficients ($K_{NZ}$ of RI and non-zero wideband (WB), and the UCI part2 includes information on PMI of wideband (WB)/subband (SB). A parameter (component) included in the UCI part1 may be a parameter (component) of part1 CSI, and a parameter (component) included in the UCI part2 may be a parameter (component) of part2 CSI. In this case, the payload of the UCI part1 is fixed, while the payload of the UCI part2 has a variable amount (size) according to RI and $K_{NZ}$. Therefore, in order to determine the payload of the UCI part2, the base station needs to first decode the UCI part1 to calculate RI and $K_{NZ}$ information. Therefore, UCI omission may have to be performed in the UCI part2. Hereinafter, the UCI omission may be replaced/used interchangeably with CSI omission.

In the case where the precoding matrix indicator (PMI) payload for Type II CSI feedback varies greatly depending on the RI, when reporting CSI using PUSCH resources, there may be a problem that all the corresponding information cannot be included within a limited reporting container size. In addition, since the RI is set by the UE, in terms of the base station, there may be limitations in scheduling resource allocation by accurately predicting the PMI payload for CSI reporting.

For this problem, in the prior art, a method of dropping a plurality of reporting settings for a plurality of component carriers (CC) of part2 CSI according to a predetermined priority rule is used in a CSI omission procedure. The base station may calculate the corresponding information by estimating the remaining omitted subband (SB) PMI in an interpolation method based on the received PMI. In order to actually determine the payload of the UCI part2 transmitted by the UE, the base station performs the same CSI omission process as the UE until the UCI code rate reaches a specific level. Therefore, only when a common method for the CSI omission is set/defined between the UE and the base station, the information of the UCI part 2 may be properly decoded by the base station.

As can be seen in 'Type II CSI codebook-based CSI reporting-related contents' described above, the enhanced Type II CSI codebook may be designed in consideration of frequency domain (FD) compression for a plurality of subband (SB) CSI by utilizing a basis such as DFT. That is, the radio channel information may be expressed by approximating information $\tilde{w}_2$ on a linear combination of the SD basis (W1) and the FD basis (Wf) predetermined or set by the UE and the base station, and the UE may perform the CSI reporting by transmitting configuration information for the codebook and $\tilde{w}_2$. In this case, complex-valued LC coefficients as many as 2L×M (e.g., the number of SD components (or bases) (2L)×the number of FD components (or bases) (M)) are different from the existing PMI for each SB. That is, since the base station cannot know the distribution according to the SD basis, the FD basis, and the layer of the corresponding LC coefficients before decoding the UCI part2 information, the above problem cannot be solved through the reuse of the conventional CSI omission rules/methods.

However, when the base station and the UE promise an omission method for LC coefficients and a corresponding bitmap based on the enhanced Type II codebook design, the base station sequentially applies the omission until the UCI code rate reaches a specific threshold code rate, and thus, it is possible to estimate the CSI omission level performed by the UE. Therefore, the present disclosure intends to propose a CSI omission(omission) (in UCI part2) method in the enhanced Type II CSI codebook.

In the present disclosure, it is assumed that the Type II CSI codebook (including the enhanced Type II CSI codebook) includes an SD basis-related matrix, an FD basis-related matrix, and a matrix of LC coefficients. Also, the matrix of LC coefficients may include amplitude coefficients and phase coefficients. The codebook may be replaced with terms such as precoder or precoding matrix, and the basis may be replaced with terms such as a basis vector, a vector, and a component. In addition, for convenience of description, the spatial domain will be expressed as SD and the frequency domain will be expressed as FD.

For example, the codebook may be denoted by $w=w_1 \tilde{w}_2 w_f^H$, where $w_1$ denotes an SD basis-related matrix, $\tilde{w}_2$ denotes a matrix of LC coefficients, and $w_f^H$ denotes an FD basis-related matrix. $\tilde{w}_2$ may be expressed as a matrix with a size of 2L×M. Here, 2L denotes the number of SD bases (here, L is the number of beam/antenna ports in SD, taking polarization into consideration, the total number of SD bases may be 2L), and M denotes the number of FD bases. Hereinafter, for convenience of description, it will be described based on the Type II CSI codebook.

<Proposal 1: Implicit CSI Omission Method>

When the UE receives the Type II CSI set as PUSCH-based reporting and the CSI payload is greater than the allocated resource capacity, for UCI part 2 (i.e., part 2 CSI) information configuration, it is possible to set/define an omission element and an omission method in a pre-defined manner.

In the above scheme, when the UE wants to report CSI to the base station, if the corresponding PUSCH resource capacity does not satisfy the CSI payload, some or all of the UCI part 2 components of the CSI are dropped to allow the UE to transmit the channel information to the base station within the available resource capacity range. In addition, whether the UE configures UCI by performing the CSI omission may be indicated to the base station.

As described above, the UCI part 2 may include information such as a bitmap per layer, an SD/FD basis indicator, LC coefficients per layer (amplitude/phase), and SCI per layer (the strongest coefficient indicator). For example, the information on the LC coefficients may include an indicator indicating amplitude coefficients and an indicator indicating phase coefficients. Also, the bitmap information for each layer may be bitmap information for indicating an indicator indicating reported amplitude coefficients and an indicator indicating phase coefficients. In this case, the information on the LC coefficients (amplitude coefficient/phase coefficient) and the bitmap information corresponding thereto may have the greatest influence on the payload size among the components. Therefore, it is necessary to specify an omission method for these parameters (components) (e.g., amplitude coefficient, phase coefficient, bitmap, etc.), and the omission method can be configured by utilizing SCI for each layer.

Since the SCI information is included in the UCI part 2, the base station may not know its value before decoding UCI part 2 based on UCI part 1 information. However, in a situation of RI>1 where the CSI omission may be applied, as described in the 'UCI parameter-related contents', as index remapping according to the FD basis and LC coefficients in the frequency domain for each layer is performed, the SCI needs to exist in a first column (i.e., column index=0) of $\tilde{w}_2$ (matrix of LC coefficients), and may be expressed in the manner of $\lceil \log_2 2L \rceil$ only for row index, which may be expressed as in FIG. 8, for example.

FIG. 8 is an example of index remapping of $\tilde{w}_2$ based on SCI. FIG. 8A illustrates the SCI index in $\tilde{w}_2$, and FIG. 8B illustrates the SCI index after the index remapping. FIG. 8 is only an example for convenience of description, and does not limit the technical scope of the present disclosure. Referring to FIG. 8, a matrix $\tilde{w}_2$ composed of LC coefficients has a size of {2L×M}. For example, in the Type II codebook in which L=4 and M=10 parameter settings are set, the LC matrix $\tilde{w}_2$ may be configured in an 8×10 matrix. As illustrated in FIG. 8A, assuming that the strongest coefficient is at the position of (5,6), the corresponding index is remapped as illustrated in FIG. 8B and may be set to a value (that is, after remapping, the index of the row of the SCI) corresponding to SCI=5 and reported.

Therefore, the LC coefficients corresponding from the FD basis and SD basis corresponding to SCI may have a greater effect on CSI accuracy compared to other LC coefficients. Based on this, it is possible to configure omission priority by differentiating the drop degree of specific components in UCI omission.

Here, the important point is that even if the SCI value included in UCI part 2 is not known, in a state where the base station and the UE agree on a method for selecting bitmap/LC coefficients based on the SCI, the base station may also be adjusted to the code rate to which the omission is applied, so the UCI part 2 may be properly decoded. Therefore, it is possible for the listed bitmap and LC coefficients to indicate the correct value for $\tilde{w}_2$ through the decoded SCI.

Hereinafter, in relation to the UCI omission method of the enhanced Type II CSI codebook proposed in the present disclosure, a method of performing UCI omission based on SCI for each layer will be described in detail.

Proposal 1-1: We propose a method of setting an omission element (e.g., bitmap, LC coefficients, etc.) and an omission scheme in the frequency domain for UCI part 2 information configuration of Type II CSI.

1) Method 1

A case in which it is assumed that the number of components (or basis) of the frequency domain FD is M, selects and reports M' components among them, and omits the rest may be considered. For example, in terms of frequency domain (FD), it is used to report LC coefficients belonging to columns of $\tilde{w}_2$ set by index=M'−1 (M'<M) consecutive or specific rules based on the FD basis (index=0) corresponding to the SCI, and the bitmap size may be set as much as the number. That is, the bitmap size may be determined based on the number of reported LC coefficients. In particular, when selecting the columns of $\tilde{w}_2$ in consideration of the delay profile shape, it may be configured in such a way that M'/2 pieces are selected starting from index=0, and the remaining M'/2 pieces are selected in the reverse order from index=M-1.

FIG. 9 illustrates an example of setting three levels of omission priority in terms of the FD together with a pair of SD bases. In FIG. 9, a situation in which the SD beam index is set to 'SD index=5/pair SD index=1' is illustrated as an example. As will be described later, the priority level for the SD index may also be configurable. FIG. 9 is only an example for convenience of description, and does not limit the technical scope of the present disclosure.

FIG. 9 illustrates an example of a method in which LC coefficients belonging to M' consecutive $\tilde{w}_2$ columns from FD index=0 described above are used for reporting and other LC coefficients are dropped, in the situation of the same parameter setting as in FIG. 8. In this time, the drop degree uses a specific Equation as an example, but means that the priority level to satisfy the resource capacity is expressed as 0, 1, 2, etc., and is set to report as many LC coefficients as possible. That is, in order to perform the CSI reporting within the allocated resource capacity, the UCI is configured from a priority level of 0 so that as many LC coefficients as possible can be reported, but when the resource capacity is insufficient, LC coefficients of lower priority are omitted may be configured and reported.

2) Method 1-1

As described in the above-described Type II CSI codebook-based CSI reporting-related content, CSI omission-related content, etc., UCI omission for one of the two groups may be performed by dividing linear combination coefficients (LCCs) to be transmitted and LC coefficients to be dropped into two groups (e.g., G1 and G2). in a situation in which UCI omission is performed. UCI omission for one of the two groups may be performed by dividing it into two groups (e.g., G1 and G2). For example, one group may be dropped/omitted according to the priority of the group. In this case, a priority level for determining which group a specific LC coefficient belongs to may be expressed as in Equation 3. The priority level may also be expressed as a priority value.

$$\mathrm{Prio}(\lambda,l,m)=2L\cdot RI\cdot\mathrm{Perm}_1(m)+RI\cdot\mathrm{Perm}_2(l)+\lambda \quad [\text{Equation 3}]$$

Here, λ is a layer index, l is an SD basis index, and m is an FD basis index. Equation 3 may assume that LC coefficients are prioritized in the order of i) layer, ii) SD index, and iii) FD index. Also, Perm1( ) and Perm2( ) indicate permutation schemes for FD and SD indices, respectively. The lower/smaller the Prio( ) (i.e., priority level) in Equation 3, the higher the priority of the corresponding LC coefficient.

Specifically, based on the priority given to each LC coefficient, the $$\left\lceil \frac{K_{NZ}^{TOT}}{2} \right\rceil$$

LC coefficients with high priority are included in the group with high priority (e.g., G1) and the remaining $$\left\lfloor \frac{K_{NZ}^{TOT}}{2} \right\rfloor$$

LC coefficients are included in the group with low priority (e.g., G2). Here, $K_{NZ}^{TOT}$ is the total number of non-zero LC coefficients of $\tilde{w}_2$. When performing the omission for CSI, a group having a lower priority may be omitted first. As an example, G2 including LC coefficients with low priority may be omitted earlier than G1. In other words, LC coefficients with high priority are reported, and LC coefficients with low priority may be omitted.

Equation 3 and related descriptions may also be referenced/used in an omission operation in a spatial region, which will be described later.

As described above, in the frequency domain (FD) of Proposal 1-1, a column corresponding to SCI is located a 0th column through a modulo (modulus) operation. How the SCI information can be reflected in the priority level (or priority value) Equation may be dealt with. That is, a method of performing CSI omission based on SCI for each layer may be considered. The permutation of the FD index may be performed based on the following methods 1)/2)/3), and the UCI omission may be performed by calculating a priority level in the frequency domain (FD).

1) Based on the 0th column (that is, based on the column to which SCI is applicable), the permutation scheme may be configured in ascending order. That is, it can be applied to Equation 3 above as Perm1(m)=m. For example, the method of permutation in ascending order may be expressed as [0, 1, 2, 3, 4, 5, 6, 7] when M=8. The priority level when m=0 (i.e., Prio( )) may be the lowest, and the priority level when m=7 may be the highest. In other words, the priority when m=0 may be the highest, and the priority when m=7 may be the lowest. LC coefficients in which m corresponds to 0 to 3 may be included in a high priority group (e.g., first group G1), and LC coefficients in which m corresponds to 4 to 7 may be included in a low priority group (e.g., second group G2).

2) The permutation scheme may be configured in consideration of the delay profile for the channel in terms of FD.

FIG. 10 illustrates an example of a delay profile of a radio channel. FIG. 10 is only an example for convenience of description, and does not limit the technical scope of the present disclosure. Referring to FIG. 10, the delay profile of the radio channel may be represented by two cases. Specifically, i) a situation in which a subset needs to be configured with the basis of increasing index based on the FD basis corresponding to FD index=0 (FIG. 10(a)), or ii) a situation in which a subset needs to be configured in consideration of both the increasing and decreasing index based on the FD basis corresponding to FD index=0 (FIG. 10(b)) may occur representatively.

Therefore, starting with the 0th FD column of $\tilde{w}_2$, which is composed of all M FD bases, a configuration method that evenly reflects the basis of the left and right (i.e., the index increasing and decreasing) is needed. That is, the basis index may be alternately selected based on the index 0. For example, +1, −1, +2, −2, . . . may be selected by crossing with respect to 0. Alternatively, the selection may be alternately selected based on 0, such as −1, +1, −2, +2. Alternatively, the basis index may be selected alternately (intersectingly) with a circular shift.

As a specific example, the FD index [0, 1, 2, 3, 4, 5, 6, 7] in the case of M=8 may be alternately (intersectingly) selected based on the FD index=0 according to the above method. For example, the index may be remapped, i.e., permutated, such as [0,7,1,6,2,5,3,4], so the priority value may be determined. The LC coefficients corresponding to the FD index of [0,7,1,6] may be included in the group (e.g., G1) with high priority, and the LC coefficients corresponding to [2,5,3,4] may be included in the group (e.g., G2) with low priority.

Alternatively, as an example, the index may be remapped as [0,1,7,2,6,3,5,4], and if it is expressed in a matrix form (Ax=b), may be expressed as a matrix of the following Equation 4. Here, A denotes Perm1( ), x denotes an FD index, and b denotes a permutation applied FD index.

$$\begin{bmatrix} 1 & 0 & 0 & 0 & 0 & 0 & 0 & 0 \\ 0 & 1 & 0 & 0 & 0 & 0 & 0 & 0 \\ 0 & 0 & 0 & 0 & 0 & 0 & 0 & 1 \\ 0 & 0 & 1 & 0 & 0 & 0 & 0 & 0 \\ 0 & 0 & 0 & 0 & 0 & 0 & 1 & 0 \\ 0 & 0 & 0 & 1 & 0 & 0 & 0 & 0 \\ 0 & 0 & 0 & 0 & 0 & 1 & 0 & 0 \\ 0 & 0 & 0 & 0 & 1 & 0 & 0 & 0 \end{bmatrix} \begin{bmatrix} 0 \\ 1 \\ 2 \\ 3 \\ 4 \\ 5 \\ 6 \\ 7 \end{bmatrix} = \begin{bmatrix} 0 \\ 1 \\ 7 \\ 2 \\ 6 \\ 3 \\ 5 \\ 4 \end{bmatrix}$$

[Equation 4]

That is, based on the permutation (i.e., the remapped index), the priority level (i.e., Prio( )) when m=0 may be the lowest, and the priority level when m=4 may be the highest. In other words, the priority when m=0 may be the highest, and the priority when m=4 may be the lowest.

Although the omission method considering the delay profile described above is excellent in terms of performance, it may be necessary to include a 1-bit indication of the delay profile shape in UCI part 2 group 0. In other words, it is necessary to indicate/set which delay profile the UE follows (e.g., either of FIG. 10A or 10B) using a 1-bit indication.

3) As a method for guaranteeing CSI performance to some extent while avoiding such an increase in signaling payload, the ascending permutation scheme may be configured including −1 or −2 FD basis. For example, it may be expressed in the order of [0, 7, 1, 2, 3, 4, 5, 6] according to an ascending permutation scheme including −1st FD basis. For example, it may be expressed in the order of [0, 7, 6, 1, 2, 3, 4, 5] according to an ascending permutation scheme including −2nd FD basis. That is, at least one of the −1st or −2nd FD bases may be positioned between permutation schemes arranged in ascending order.

As another example, in the permutation configuration, instead of starting with the 0th FD basis, the −1 or −2nd FD basis may be configured as a starting point. The permutation configuration may be expressed as Perm1(m)=(m−A)mod M. Here, A may be, for example, a value set through a higher layer or a fixed value using a value such as A={M−3, M−2, M−1, 0}, and the UE may report information by including the information in the UCI part 2. As an example for this, when M=8 and A=M−2, it may be permutated as in [6 7 0 1 2 3 4 5].

In the FD region, based on which permutation scheme of 1)/2)/3) described above, the UCI omission may be performed according to a method predefined between the base station and the terminal. Alternatively, the base station may set a permutation scheme to the UE. Alternatively, the UE may report a permutation scheme applied to UCI omission to the base station together with CSI reporting.

Based on the above-described permutation scheme, a priority level for the LC coefficients may be calculated, and the LC coefficients may be divided into a plurality of groups based on the priorities of the LC coefficients. The LC coefficients of the lower group may be omitted according to the priority of the group. That is, the omission may be performed according to the priority of the LC coefficient and reported to the base station.

Proposal 1-2: We propose a method of setting an omission element (e.g., bitmap, LC coefficients, etc.) and an omission scheme in the spatial domain for the UCI part 2 information configuration of Type II CSI.

1) Method 1

In a spatial domain (SD) aspect in a manner similar to that of Proposal 1-1, it may be set in a manner such as reporting the LC coefficients belonging to two rows by utilizing the SD basis corresponding to SCI and the SD basis being a pair in terms of the antenna port, and the bitmap size may be set as many as the number. Alternatively, it can be used to operate by using ±M' SD bases based on a specific SD basis or to report LC coefficients belonging to a row of $\tilde{w}_2$ set through a specific rule.

Figure 11:
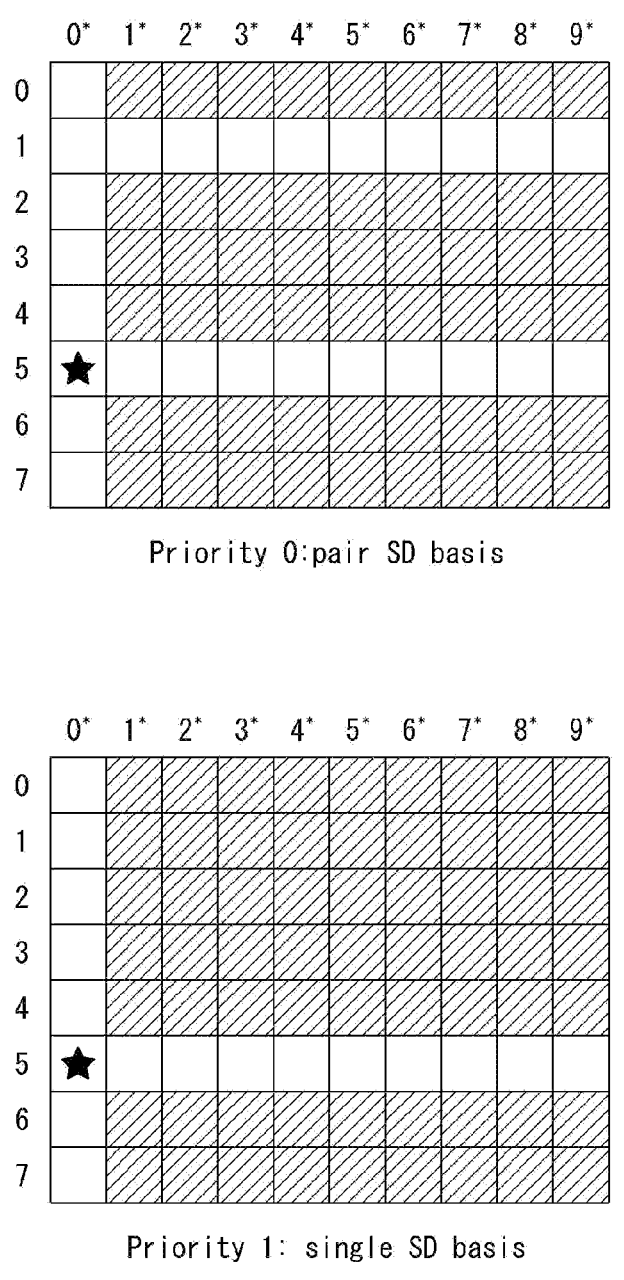

FIG. 11 illustrates an example of setting omission priority in SD aspect with a single FD base. FIG. 11 is only an example for convenience of description, and does not limit the technical scope of the present disclosure. It is assumed that SCI index=5 in FIG. 11.

Referring to FIG. 11, it may be operated in a method of reporting LC coefficients included in a beam index (index=1) set in a paired antenna port based on SCI (index=5) and dropping/omission of other values. In addition, as the number of rows to be reported (to be used) is reduced, it is possible to set different priority levels. For example, a case of reporting a pair SD base may be set as priority 0, and a case of reporting a single SD base may be set as a priority of 1, and the priority level may be set. When it is impossible to report SD bases corresponding to priority 0 within the allocated resource capacity (i.e., when reporting of pair SD bases is not possible), SD bases (i.e., single SD bases) corresponding to priority 1 may be reported.

2) Method 1-1

Similar to the methods of Proposal 1-1 described above, a method of performing permutation in consideration of SCI in a permutation scheme in terms of SD may be considered. It may be said that the influence of the SD beam corresponding to the value indicated by the SCI is most conspicuously reflected in the spatial domain SD of the proposal 1-2. Therefore, a permutation scheme such as 1)/2)/3) below may be considered.

1) A method of applying permutation in the spatial region SD regardless of SCI, that is, the permutation scheme may be configured in ascending order based on the 0th row. That is, it can be applied to Equation 3 above as Perm$_2$(l)=l.

2) It is possible to configure a permutation scheme such that the index is mapped to the 0th row in a row to which the SCI belongs through a modulo operation by reflecting the SCI information. That is, it may be applied as Perm2(1)=(1−SCI)mod 2L. Here, 1 denotes an SD basis index, and L denotes the number of SD basis vectors. For example, in FIG. 19, when L=4 and SCI=5, a 6th row (SD index=5) is remapped to the 0th index due to the Perm2(1) operation, and the same applies to other SD indexes, so the index may be reset with a circular shift. For example, a row index may be reset as in [5, 6, 7, 0, 1, 2, 3, 4]. Therefore, since the case in which the remapped row index is 4 has a low priority, it may be omitted first.

3) A permutation method in which an SD index is preferentially assigned to an SCI and a specific value (SCI_pair) corresponding thereto may be configured. Here, SCI_pair indicates an index having opposite polarization with respect to an SD beam corresponding to SCI. For example, in the case of L=4, SCI=5 indicates the second SD beam with [+45 slant angle], and the corresponding SCI_pair is the index having the opposite polarization that is the second SD beam with [−45 slant angle], that is, SD index '1'. Therefore, it may be determined as SCI_pair=(SCI−L)mod 2L for a specific SCI.

Since SCI_pair shares the same SD beam as SCI, it is highly likely that it includes many LC coefficients that affect CSI accuracy. Therefore, if the row corresponding to SCI and the row corresponding to SCI_pair are mapped to the 0th and 1st indexes and given a priority level, it may be effective in reducing the loss of CSI accuracy while performing the UCI omission. An SD permutation embodiment for this may be expressed as $Perm_2(l)=A_1$ using FIG. 11 and the related description. Here, $$A = \begin{bmatrix} SCI(=5) \\ SCI\_pair(=1) \\ x \end{bmatrix},$$

$x \in R^{2L-2}$: Ascending sequence vector (excluding SCI and SCI_pair).

That is, in the above embodiment, it may be expressed as $$x = \begin{bmatrix} 0 \\ 2 \\ 3 \\ 4 \\ 6 \\ 7 \end{bmatrix}.$$

In the SD region, based on which permutation method of 1)/2)/3) described above, the UCI omission may be performed according to a method predefined between the base station and the terminal. Alternatively, the base station may configure the permutation method to the UE. Alternatively, the UE may report a permutation method applied to UCI omission to the base station together with CSI reporting.

That is, the omission in the FD aspect of Proposal 1-1 and the omission in the SD aspect of Proposal 1-2 may operate independently or in the form of an intersection, and the configuration according to this will be possible with higher layer configured or pre-defined.

For example, in Equation 3, the permutation scheme in FD may be performed by one of the methods described in Proposal 1-1, and the permutation scheme in SD may be performed by one of the methods described in Proposal 1-2, and the priority level may be calculated by considering both permutations in SD and SD. As a specific example, as the permutation scheme in FD, a method of alternately selecting a basis index based on index 0 (e.g., alternate selection based on example 0, such as +1, −1, +2, −2, . . . ) may be applied, and the permutation scheme in SD, a method of selecting an index in ascending order based on the 0th row may be applied. The UE may perform CSI omission in consideration of the calculated priority step, and may configure UCI to satisfy the resource size allocated for CSI reporting and transmit the UCI to the base station.

<Proposal 2: Explicit CSI Omission Method>

When the UE receives Type II CSI for PUSCH-based reporting and the CSI payload is larger than the allocated resource capacity, the UE may perform a UCI omission operation, and the UE may consider a method of setting the components of UCI part 2 information and the omission method through information (e.g., indicator) related to UCI omission.

In the scheme of Proposal 1, if it was to implicitly estimate the degree of CSI omission by applying the same set/defined omission method until the UCI code rate (code rate) satisfies a specific threshold through the RI of UCI part 1 and the number of non-zero coefficients (NNZC) across layers at the base station side, in proposal 2, a method in which the UE includes an omission indicator (e.g., UCI omission-related information) in UCI part 1, including the operation of proposal 1, and transmits the omission indicator to the base station may be considered.

Specifically, the presence or absence of UCI omission, which elements of UCI part 2 became the target of omission if UCI omission has been performed, how much omission was performed, etc., may be set through a higher layer or set/transmitted to the base station according to a predefined rule. Although proposal 2 may increase the payload of UCI part 1 compared to proposal 1, it has the advantage that the UE and the base station may promise detailed operations for the CSI omission and accurately recognize the CSI omission.

For example, the LC coefficients are configured for amplitude and phase, respectively, and one of them may indicate drop/omission. Alternatively, it is possible not only to specify the omission setting method in terms of the FD and/or SD, but also to apply layer-common/layer-group-specific operation designation of the corresponding operation by promising. Alternatively, configuring the UCI part 2 by adjusting the amplitude of the LC coefficients and the quantization degree of the phase may also have a great effect in terms of payload reduction.

As an example of a method of setting the components and omission method of UCI part 2 according to information (e.g., UCI omission indicator) related to UCI omission, Table 15 shows an example of Type II CSI omission operation according to the UCI omission indicator in the case of layer-common.

TABLE 15

| Indicator | LC coefficients | | Omission priority | | 양자화 정도 | |
|---|---|---|---|---|---|---|
| (2bits) | Amp. | Phase | FD | SD | Amp. | Phase |
| '00' | Default | Default | Default | Default | Default | Default |
| '01' | O | X | 2 | 1 | QPSK | — |
| '10' | X | O | 1 | 1 | — | 8-PSK |
| '11' | O | O | 0 | 0 | 16-PSK | 16-PSK |

The UE may transmit/configure information, such as omission state of the LC coefficients (e.g., amplitude coefficient and phase coefficient), omission priority for the frequency domain and spatial domain, quantization degree, to the base station through information (e.g., indicator) related to UCI omission. The base station may clearly recognize the UCI omission operation of the UE based on the information related to the UCI omission.

Through the above-described proposed method and/or embodiments, the UE may perform the UCI omission within the allocated resource capacity and report the channel state information to the base station.

FIG. 12 illustrates an example of a signaling flowchart between a user equipment (UE) and a base station to which the method and/or embodiment proposed in the present disclosure can be applied. FIG. 12 is only for convenience of description, and does not limit the scope of the present disclosure. Referring to FIG. 12, it is assumed that the UE and/or the base station operate based on the methods and/or embodiments of the above-described proposals 1 and 2. Some of the steps described in FIG. 12 may be merged or omitted. In addition, in performing the procedures described below, the CSI-related operation of FIG. 7 may be considered/applied.

The base station may refer to an object that transmits and receives data to and from the UE. For example, the base station may be a concept including one or more transmission points (TPs), one or more transmission and reception points (TRPs), and the like. In addition, the TP and/or TRP may include a panel of a base station, a transmission and reception unit, and the like. In addition, the TRP may be classified according to information (e.g., index, ID) on the CORESET group (or CORESET pool). As an example, when one UE is configured to perform transmission/reception with a plurality of TRPs (or cells), this may mean that a plurality of CORESET groups (or CORESET pools) are configured for one UE. The setting for such a CORESET group (or CORESET pool) may be performed through higher layer signaling (e.g., RRC signaling, etc.).

The UE may receive configuration information related with CSI from the base station (S1210). That is, the base station may transmit the configuration information to the UE. The configuration information may be received through higher layer signaling (e.g., radio resource control (RRC) or medium access control-control element (MAC-CE)). For example, when the configuration information is preset, the corresponding step may be omitted.

The configuration information may include BWP configuration information related to the bandwidth part (BWP). One or more BWPs may be configured based on the BWP configuration information. For example, the BWP configuration information may include information such as a cyclic prefix related to the BWP, a location of a frequency domain, and a subcarrier interval.

The configuration information may include configuration information on a reference signal for CSI. For example, the configuration information for the reference signal may include information on a period in which the reference signal is transmitted, time domain behavior information of the reference signal, and the like. In addition, information on a resource and/or resource set through which the reference signal is transmitted may be included.

The configuration information may include information on a CSI reporting setting. For example, based on the configuration information, PUSCH-based CSI reporting or PUCCH-based CSI reporting may be set. In addition, the configuration information may include resource allocation information for CSI reporting.

For example, the configuration information may include information related to the CSI omission operation of the UE. As an example, it may include information (e.g., a permutation method) used when determining the priority of CSI.

The UE may receive activation information from the base station (S1215). That is, the base station may transmit activation information to the UE. For example, the activation information may be transmitted through MAC-CE or DCI. The activation information may include information for activating a specific BWP among one or more BWPs. For example, information indicating the BWP to be used by the UE for PUSCH transmission may be included in DCI for PUSCH scheduling, that is, the base station may indicate or set the BWP (i.e., active BWP) to be used by the UE for PUSCH transmission through DCI.

The UE may receive a reference signal (RS) from the base station (S1220). That is, the base station may transmit a reference signal to the UE. For example, the reference signal may be received or transmitted based on the configuration information. For example, the reference signal may be received/transmitted based on a specific BWP activated based on the activation information. For example, the reference signal may be a CSI-RS. The reference signal may be transmitted periodically, semi-continuously, or aperiodically from the base station. In addition, the reference signal may be used for CSI measurement and calculation.

The UE may measure/calculate CSI (S1225). For example, the CSI may be measured/calculated based on the (enhanced) Type II CSI codebook, and may include information on a precoding matrix (e.g., PMI, etc.). For example, a precoding matrix based on a linear combination of a basis in a frequency domain and a basis in a spatial domain may be used for CSI calculation. The row index of the precoding matrix may be related to a basis of a spatial domain, and a column index of the matrix may be related to a basis of a frequency domain. A column index of the strongest coefficient indicator (SCI) may correspond to '0'.

The CSI includes information for coefficients related to linear coupling coefficients (e.g., amplitude coefficient, phase coefficient, etc.), for example, information on amplitude coefficient, information on phase coefficient, information on the bitmap form related to the coefficients (amplitude coefficient and phase coefficient), information on the strongest coefficient for each layer, information on the basis of the spatial domain, information on the basis of the frequency domain, and the like.

The UE may transmit the CSI to the base station (S1230). That is, the base station may receive the CSI from the UE. For example, the CSI may be transmitted through the PUSCH or PUCCH. The CSI reporting transmitted to the base station may be composed of a first part and a second part. For example, the first part may correspond to the above-described uplink control information (UCI) part 1 (i.e., part 1 CSI), and the second part may correspond to UCI part 2 (i.e., part 2 CSI). For example, an activated BWP (e.g., active UL BWP) may be configured based on activation information (e.g., DCI scheduling PUSCH), and the CSI may be transmitted through the activated BWP.

Resources for CSI reporting may be allocated based on the configuration information, and when the allocated resource capacity is smaller than the UCI payload (i.e., CSI payload to be reported) size, some of the calculated CSI may be omitted to configure CSI reporting in order to perform CSI reporting within a possible resource capacity range. As an example, some of the components constituting the second part (i.e., UCI part 2) of CSI reporting may be omitted. The operation related to the CSI omission may be performed based on the above-described proposed method (e.g., proposal 1/proposal 2, etc.).

For example, each of the information on the amplitude coefficient, the information on the phase coefficient, and the bitmap information related to the coefficients may be classified into a plurality of groups based on a priority value. The priority value and the priority of each information component may be inversely proportional to each other. That is, as the priority value is smaller, the priority of the corresponding component may be higher. For example, according to a priority determined based on the priority value, a component having a higher priority among components of information on amplitude coefficients, information on phase coefficients, and bitmap information related to the coefficients may be included in the first group, and the group with low priority may be included in the second group.

In addition, when performing the omission for CSI, a group having a lower priority may be omitted first. For example, the first group may have a higher priority than the second group. Accordingly, the second group may be omitted earlier than the first group. In other words, the information on amplitude coefficients, the information on phase coefficients, and the bitmap information with high priority may be reported, and the omission (omission) may be performed from information with low priority.

The priority value used to classify the information on the amplitude coefficient, the information on the phase coefficient, and/or the components of the bitmap information related to the coefficients into a plurality of groups may be determined based on at least one of i) layer index, ii) the index of the spatial area associated with/related to each component, or iii) the index of the frequency domain associated with/related to each component. For example, the priority value may be determined based on i) a layer index ii) an index of a spatial domain associated with/related to each component, and iii) an index of a frequency domain associated with/related to each component.

For example, the priority value may increase in an order in which a higher index and a lower index of the indexes of the frequency domain associated with/related to the components are sequentially crossed based on a predefined specific index. The predefined specific index may be associated with/related to an index in the frequency domain of a strongest coefficient among the coefficients. For example, the predefined specific index may be '0'. This is because the index is remapped so that the index of the strongest coefficient in the frequency domain is located in the first column (i.e., column index=0).

As another example, the priority value may increase in an ascending order of the index of the spatial region. As another example, i) the index of the spatial region of the strongest coefficient and ii) the index of the spatial region corresponding to the beam having the opposite polarization with respect to the beam corresponding to the strongest coefficient may have the highest priority (i.e., the priority value may be the smallest). After that, the priority values of the remaining indexes may be sequentially determined in ascending order. Alternatively, the indexes are remapped so that the index of the spatial region of the strongest coefficient becomes 0, and the remaining indexes are also remapped in the form of a cyclic shift, and then priority values may be determined in the order of the remapped indexes.

As another example, when some of the bases (or components) (e.g., M) of the frequency domain are reported (e.g., M') and the remaining parts are omission, it is possible to select the consecutive indexes as many as the bases to be reported based on based on the index (e.g., index=0) in the frequency domain of the strongest coefficient, and report the information on the corresponding coefficients and the information in the form of a bitmap corresponding to the coefficients. As a similar example, when reporting some of the basis (or components) of the spatial domain, the index corresponding to the index in the spatial domain of the strongest coefficient and the coefficients corresponding to the indexes of the SD bases that is a pair in terms of the antenna port and the information in the form of the bitmap corresponding to the coefficients may be reported (coefficients corresponding to the remaining SD base indexes and the information in the form of the bitmap corresponding thereto may be omitted).

For example, the CSI reporting may further include information indicating a delay profile applied by the UE or information used by the UE to determine a priority for CSI omission (e.g., a permutation scheme).

As described in the above-described proposal 2, the CSI reporting may further include information related to the CSI omission operation. In other words, the UE may explicitly transmit information related to the CSI omission operation to the base station. For example, since the CSI reporting may be configured by omission of a specific group according to the priority of a plurality of groups, it may include information related to the omission of a specific group to be omitted. For example, the information related to the CSI omission operation may be transmitted while being included in the first part of the CSI reporting.

For example, the information related to the CSI omission operation may include information on at least one of i) presence and absence of omission operation (i.e., whether the UE has performed omission), ii) omission target, or iii) omission degree (or omission quantity). The UE may transmit/configure information, such as omission state of the coefficients, omission priority for the frequency domain and spatial domain, quantization degree, to the base station through information (e.g., indicator) related to the CI omission. The base station may clearly recognize the CSI omission operation of the UE based on the information related to the CSI omission.

FIG. 13 illustrates an example of an operation flowchart of a UE to which the method and/or embodiment proposed in the present disclosure may be applied. FIG. 13 is only for convenience of description, and does not limit the scope of the present disclosure. Referring to FIG. 13, it is assumed that the UE and/or the base station operate based on the methods and/or embodiments of the above-described proposals 1 and 2. Some of the steps described in FIG. 13 may be merged or omitted. In addition, in performing the procedures described below, the CSI-related operation of FIG. 7 may be considered/applied.

The UE may receive the configuration information including the BWP configuration related to the bandwidth part (BWP) from the base station (S1310). For example, the BWP configuration may include information such as a cyclic prefix related to the BWP, a location of a frequency domain, and a subcarrier interval. For example, on or more BWPs may be configured based on the BWP configuration information. For example, the BWP configuration information may be received through higher layer signaling (e.g., RRC).

For example, the operation of the UE (100/200 in FIGS. 15 to 19) of the above-described step S1310 receiving configuration information from the base station (100/200 in FIGS. 15 to 19) may be implemented by the device in FIGS. 15 to 19 to be described below. For example, referring to FIG. 16, one or more processors 202 may control one or more transceivers 206 and/or one or more memories 204 or the like to receive the configuration information, and one or more transceivers 206 may receive the configuration information from the base station.

The UE may receive activation information from the base station (S1320). The activation information may include information for activating a specific bandwidth part among one or more bandwidth parts based on the BWP configuration. As an example, specific active UL BWP and active DL BWP may be configured/indicated based on the activation information. For example, the activation information may be received through the MAC-CE or DCI.

For example, the operation of the UE (100/200 in FIGS. 15 to 19) of the above-described step S1320 receiving the activation information from the base station (100/200 in FIGS. 15 to 19) may be implemented by the device in FIGS. 15 to 19 to be described below. For example, referring to FIG. 16, one or more processors 202 may control one or more transceivers 206 and/or one or more memories 204 or the like to receive the activation information, and one or more transceivers 206 may receive the activation information from the base station.

The UE may receive a reference signal (RS) from the base station (S1330). For example, the reference signal may be received based on a specific BWP (e.g., active DL BWP) activated based on the activation information. For example, the reference signal may be a CSI-RS. The reference signal may be transmitted periodically, semi-continuously, or aperiodically from the base station. In addition, the reference signal may be used for CSI measurement and calculation.

For example, the operation of the UE (100/200 in FIGS. 15 to 19) of the above-described step S1330 receiving the reference signal from the base station (100/200 in FIGS. 15 to 19) may be implemented by the device in FIGS. 15 to 19 to be described below. For example, referring to FIG. 16, one or more processors 202 may control one or more transceivers 206 and/or one or more memories 204 or the like to receive the reference signal, and one or more transceivers 206 may receive the reference signal from the base station.

The UE may measure/calculate CSI (S1340). For example, the CSI may be measured/calculated based on the (enhanced) Type II CSI codebook, and may include information on a precoding matrix (e.g., PMI, etc.).

For example, the CSI may include information related with coefficients. The information related to the coefficients may include at least one of i) information on the amplitude coefficient, ii) information on the phase coefficient, or iii) bitmap information related to the amplitude coefficient and the phase coefficient.

For example, the operation of measuring/calculating the CSI by the UE (100/200 in FIGS. 15 to 19) in step S1340 described above may be implemented by the device in FIGS. 15 to 19 to be described below. For example, referring to FIG. 16, one or more processors 202 may control one or more transceivers 206 and/or one or more memories 204 to measure/calculate the CSI.

The UE may transmit the CSI to the base station (S1350). The CSI may be transmitted through a physical uplink shared channel (PUSCH) or a physical uplink control channel (PUCCH). The reported CSI may include the first part and the second part. For example, the first part may correspond to the above-described uplink control information (UCI) part 1 (i.e., part 1 CSI), and the second part may correspond to UCI part 2 (i.e., part 2 CSI). For example, the CSI may be transmitted based on a specific BWP (e.g., active UL BWP) activated based on the activation information.

Based on the priority rule, some of the CSI may be omitted and transmitted. As an example, a part of the second part of CSI reporting may be omitted. Based on the above-described proposal methods (e.g., proposal 1, proposal 2, etc.), the omission of the second part of the CSI reporting may be performed. For example, each of the elements of the information related to the coefficients (e.g., information on the amplitude coefficient, information on the phase coefficient, bitmap information related to the amplitude coefficient and the phase coefficient) may be classified into a first group and a second group based on a priority value. In addition, the CSI reporting may be configured by the omission of the specific group according to the priority of the first group and the second group. For example, in the priority rule, the priority of the first group may be defined as higher than that of the second group. A group (e.g., second group) with a lower priority may be omitted first. As an example, a specific group to be included in the second part of the CSI reporting may be omitted.

For example, as the priority value is smaller, the priority of each component may be higher. For example, according to the priority determined based on the priority value, an element with high priority among elements of the information related to the coefficients may be included in the first group, and an element with low priority may be included in the second group. The priority of the first group is higher than that of the second group, and thus, the second group may be omitted before the first group.

The priority value may be determined based on at least one of i) a layer index ii) an index of a spatial domain associated with/related to each component or iii) an index of a frequency domain associated with/related to each component. For example, the priority value may be determined based on i) a layer index ii) an index of a spatial domain associated with/related to each component, and iii) an index of a frequency domain associated with/related to each component.

For example, the priority value may increase in an order in which a higher index and a lower index of the indexes of the frequency domain associated with/related to the components are sequentially crossed based on a predefined specific index. The predefined specific index may be associated with/related to an index in the frequency domain of a strongest coefficient among the coefficients. For example, the predefined specific index may be '0'.

As another example, the priority value may increase in an ascending order of the index of the spatial region. As another example, i) the index of the spatial region of the strongest coefficient and ii) the index of the spatial region corresponding to the beam having the opposite polarization with respect to the beam corresponding to the strongest coefficient may have the highest priority (i.e., the priority value may be the smallest). After that, the priority values of the remaining indexes may be sequentially determined in ascending order. Alternatively, the indexes are remapped so that the index of the spatial region of the strongest coefficient becomes 0, and the remaining indexes are also remapped in the form of a cyclic shift, and then priority values may be determined in the order of the remapped indexes.

As another example, when some of the bases (or components) (e.g., M) of the frequency domain are reported (e.g., M') and the remaining parts are omission, it is possible to select the consecutive indexes as many as the bases to be reported based on based on the index (e.g., index=0) in the frequency domain of the strongest coefficient, and report the information on the corresponding coefficients and the information in the form of a bitmap corresponding to the coefficients. As a similar example, when reporting some of the basis (or components) of the spatial domain, the index corresponding to the index in the spatial domain of the strongest coefficient and the coefficients corresponding to the indexes of the SD bases that is a pair in terms of the antenna port and the information in the form of the bitmap corresponding to the coefficients may be reported (coefficients corresponding to the remaining SD base indexes and the information in the form of the bitmap corresponding thereto may be omitted).

The CSI reporting may further include information related to the CSI omission. For example, since the CSI reporting may be configured by omission of a specific group according to the priority of a plurality of groups, it may include information related to the omission of a specific group to be omitted. For example, the information related to the omission of the specific group may include information on at least one of i) presence and absence of omission (i.e., whether the UE has performed omission), ii) omission target, or iii) omission degree (or omission quantity). For example, the information (i.e., information related to omission of a specific group) related to the CSI omission may be transmitted while being included in the first part of the CSI reporting.

For example, the operation of the UE (100/200 in FIGS. 15 to 19) of the above-described step S1350 transmitting the CSI reporting to the base station (100/200 in FIGS. 15 to 19) may be implemented by the device in FIGS. 15 to 19 to be described below. For example, referring to FIG. 16, one or more processors 202 may control one or more transceivers 206 and/or one or more memories 204 or the like to transmit the CSI reporting, and one or more transceivers 206 may transmit the CSI reporting to the base station.

FIG. 14 illustrates an example of an operation flowchart of the base station to which the method and/or embodiment proposed in the present disclosure may be applied. FIG. 14 is only for convenience of description, and does not limit the scope of the present disclosure. Referring to FIG. 14, it is assumed that the UE and/or the base station operate based on the methods and/or embodiments of the above-described proposals 1 and 2. Some of the steps described in FIG. 14 may be merged or omitted. In addition, in performing the procedures described below, the CSI-related operation of FIG. 7 may be considered/applied.

The BS may collectively mean an object that performs data transmission/reception with the UE. For example, the BS may include one or more TPs (Transmission Points), one or more TRPs (Transmission and Reception Points), and the like. Furthermore, the TP and/or TRP may include a panel, a transmission and reception unit, and the like of the BS. In addition, as described above, the TRP may be distinguished according to information (e.g., index or ID) for a CORESET group (or CORESET pool). In one example, in the case that a single UE is configured to perform transmission/reception with multiple TRPs (or cells), this may mean that multiple CORESET groups (or CORESET pools) may be configured for the UE. A configuration for the CORESET group (or CORESET pool) may be performed through higher layer signaling (e.g., RRC signaling).

The base station may transmit configuration information to the UE (S1410). The configuration information may be transmitted through higher layer signaling (e.g., RRC or MAC-CE).

The configuration information may include configuration information related to BWP. One or more BWPs based on the BWP configuration information may be configured.

The configuration information may include configuration information related with CSI. The CSI-related configuration information may include configuration information for a reference signal for CSI, resource allocation information for CSI reporting, and the like. For example, the configuration information for the reference signal may include information on a period in which the reference signal is transmitted, time domain behavior information of the reference signal, and the like. In addition, information on a resource and/or resource set through which the reference signal is transmitted may be included. In addition, the CSI-related configuration information may include information on a CSI reporting setting. For example, whether PUSCH-based CSI reporting or PUCCH-based CSI reporting may be configured based on the information on the CSI reporting setting. For example, the CSI-related configuration information may include information related to the CSI omission operation of the UE. As an example, it may include information (e.g., a permutation method) used when determining the priority of CSI.

For example, the operation of the base station (100/200 in FIGS. 15 to 19) of the above-described step S1410 transmitting the configuration information (e.g., BWP configuration information, CSI-related configuration information) to the UE (100/200 in FIGS. 15 to 19) may be implemented by the device in FIGS. 15 to 19 to be described below. For example, referring to FIG. 16, one or more processors 202 may control one or more transceivers 206 and/or one or more memories 204 or the like to transmit the configuration information, and one or more transceivers 206 may transmit the configuration information to the UE.

The base station may transmit activation information to the UE (S1420). For example, the activation information may be transmitted through MAC-CE or DCI. For example, the activation information may include information for activating a specific BWP among one or more BWPs. A specific BWP may be activated based on the activation information.

For example, the operation of the base station (100/200 in FIGS. 15 to 19) of the above-described step S1420 transmitting the activation information (e.g., BWP activation information) to the UE (100/200 in FIGS. 15 to 19) may be implemented by the device in FIGS. 15 to 19 to be described below. For example, referring to FIG. 16, one or more processors 202 may control one or more transceivers 206 and/or one or more memories 204 or the like to transmit the activation information, and one or more transceivers 206 may transmit the activation information to the UE.

The base station may receive a reference signal (RS) to the UE (S1430). For example, the reference signal may be transmitted based on a specific BWP activated based on the activation information. For example, the reference signal may be transmitted based on the above-described CSI-related configuration information. For example, the reference signal may be a CSI-RS. The reference signal may be transmitted periodically, semi-continuously, or aperiodically. In addition, the reference signal may be used for CSI measurement and calculation of the UE.

For example, the operation of the base station (100/200 in FIGS. 15 to 19) of the above-described step S1430 transmitting the reference signal to the UE (100/200 in FIGS. 15 to 19) may be implemented by the device in FIGS. 15 to 19 to be described below. For example, referring to FIG. 16, one or more processors 202 may control one or more transceivers 206 and/or one or more memories 204 or the like to transmit the reference signal, and one or more transceivers 206 may transmit the reference signal to the UE.

The base station may receive the CSI from the UE (S1440). The CSI may be transmitted through the PUSCH or PUCCH. The CSI may include the first part and the second part. For example, the first part may correspond to the above-described uplink control information (UCI) part 1 (i.e., part 1 CSI), and the second part may correspond to UCI part 2 (i.e., part 2 CSI). For example, the CSI may be received based on a specific BWP (e.g., active UL BWP) activated based on the activation information.

For example, the CSI may be measured/calculated based on the (enhanced) Type II CSI codebook, and may include information on a precoding matrix (e.g., PMI, etc.). For example, the CSI may include information related with coefficients. The information related to the coefficients may include at least one of i) information on the amplitude coefficient, ii) information on the phase coefficient, or iii) bitmap information related to the amplitude coefficient and the phase coefficient.

As described in the above-described proposal methods (e.g., proposal 1, proposal 2, etc.), the CSI reporting in which some of the CSI calculated (measured) based on the priority rule is received may be received. As an example, a part of the second part of the CSI reporting may be omitted. For example, each of the elements of the information (e.g., information on the amplitude coefficient, information on the phase coefficient, bitmap information related to the amplitude coefficient and the phase coefficient) related to the coefficients has a priority value (priority). value) may be classified into a plurality of groups based on a priority value, and a specific group is omitted according to the priority of the plurality of groups (e.g., the first group and the second group), so the CSI reporting may be configured. A group with lower priority may be omitted first. For example, in the priority rule, the priority of the first group may be defined as higher than that of the second group.

The priority value may be determined based on at least one of i) a layer index ii) an index of a spatial domain associated with/related to each component or iii) an index of a frequency domain associated with/related to each component. For example, the priority value may be determined based on i) a layer index ii) an index of a spatial domain associated with/related to each component, and iii) an index of a frequency domain associated with/related to each component.

For example, the priority value may increase in an order in which a higher index and a lower index of the indexes of the frequency domain associated with/related to the components are sequentially crossed based on a predefined specific index. The predefined specific index may be associated with/related to an index in the frequency domain of a strongest coefficient among the coefficients. For example, the predefined specific index may be '0'. As another example, the priority value may increase in an ascending order of the index of the spatial region.

For example, the operation of the base station (100/200 in FIGS. 15 to 19) of the above-described step S1440 receiving the CSI from the UE (100/200 in FIGS. 15 to 19) may be implemented by the device in FIGS. 15 to 19 to be described below. For example, referring to FIG. 16, one or more processors 202 may control one or more transceivers 206 and/or one or more memories 204 or the like to receive the CSI, and one or more transceivers 206 may receive the CSI from the UE.

In addition, the UE and/or the base station operating according to each step of the above-described methods and embodiments (e.g., proposal 1/proposal 2, etc.), FIG. 12, 13 or 14, etc., may be specifically implemented by the device in FIGS. 15 to 19. For example, the base station may correspond to a first radio device, the UE may correspond to a second radio device, and vice versa may be considered in some cases.

For example, the above-described base station/UE signaling and operation (e.g., FIGS. 12/13/14, etc.) may be processed by one or more processors (e.g., 102, 202) of FIGS. 15 to 19, and the above-described base station/UE signaling and operation (e.g., FIGS. 12/13/14, etc.) may be stored in the memory (for example, one or more memory (for example, 104 and 204) in FIGS. 15 to 19) in the form of an instruction/program (e.g., instruction, executable code) for driving at least one processor (e.g., 102, 202) of FIGS. 15 to 19.

Example of Communication System to which Present Disclosure is Applied

Although not limited thereto, but various descriptions, functions, procedures, proposals, methods, and/or operation flowcharts of the present disclosure, which are disclosed in this document may be applied to various fields requiring wireless communications/connections (e.g., 5G) between devices.

Hereinafter, the communication system will be described in more detail with reference to drawings. In the following drawings/descriptions, the same reference numerals will refer to the same or corresponding hardware blocks, software blocks, or functional blocks if not differently described.

FIG. 15 illustrates a communication system applied to the present disclosure.

Referring to FIG. 15, a communication system 1 applied to the present disclosure includes a wireless device, a BS, and a network. Here, the wireless device may mean a device that performs communication by using a wireless access technology (e.g., 5G New RAT (NR) or Long Term Evolution (LTE)) and may be referred to as a communication/wireless/5G device. Although not limited thereto, the wireless device may include a robot 100a. vehicles 100b-1 and 100b-2, an eXtended Reality (XR) device 100c, a hand-held device 100d, a home appliance 100e, an Internet of Thing (IoT) device 100f, and an AI device/server 400. For example, the vehicle may include a vehicle with a wireless communication function, an autonomous driving vehicle, a vehicle capable of performing inter-vehicle communication, and the like. Here, the vehicle may include an Unmanned Aerial Vehicle (UAV) (e.g., drone). The XR device may include an Augmented Reality (AR)/Virtual Reality (VR)/Mixed Reality (MR) device and may be implemented as a form such as a head-mounted device (HMD), a head-up display (HUD) provided in the vehicle, a television, a smart phone, a computer, a wearable device, a home appliance device, digital signage, a vehicle, a robot, etc. The hand-held device may include the smart phone, a smart pad, a wearable device (e.g., a smart watch, a smart glass), a computer (e.g., a notebook, etc.), and the like. The home appliance device may include a TV, a refrigerator, a washing machine, and the like. The IoT device may include a sensor, a smart meter, and the like. For example, the BS and the network may be implemented even the wireless device and a specific wireless device 200a may operate an eNB/network node for another wireless device.

The wireless devices 100a to 100f may be connected to a network 300 through a BS 200. An artificial intelligence (AI) technology may be applied to the wireless devices 100a to 100f and the wireless devices 100a to 100f may be connected to an AI server 400 through the network 300. The network 300 may be configured by using a 3G network, a 4G (e.g., LTE) network, or a 5G (e.g., NR) network. The wireless devices 100*a* to 100*f* may communicate with each other through the BS 200/network 300, but may directly communicate with each other without going through the BS/network (sidelink communication). For example, the vehicles 100*b*-1 and 100*b*-2 may perform direct communication (e.g., Vehicle to Vehicle (V2V)/Vehicle to everything (V2X) communication). Further, the IoT device (e.g., sensor) may perform direct communication with other IoT devices (e.g., sensor) or other wireless devices 100*a* to 100*f*.

Wireless communications/connections 150*a*, 150*b*, and 150*c* may be made between the wireless devices 100*a* to 100*f* and the BS 200 and between the BS 200 and the BS 200. Here, the wireless communication/connection may be made through various wireless access technologies (e.g., 5G NR) such as uplink/downlink communication 150*a*, sidelink communication 150*b* (or D2D communication), and inter-BS communication 150*c* (e.g., relay, Integrated Access Backhaul (IAB). The wireless device and the BS/the wireless device and the BS and the BS may transmit/receive radio signals to/from each other through wireless communications/connections 150*a*, 150*b*, and 150*c*. For example, the wireless communications/connections 150*a*, 150*b*, and 150*c* may transmit/receive signals through various physical channels. To this end, based on various proposals of the present disclosure, at least some of various configuration information setting processes, various signal processing processes (e.g., channel encoding/decoding, modulation/demodulation, resource mapping/demapping, etc.), a resource allocation process, and the like for transmission/reception of the radio signal may be performed.

Example of Wireless Device to Which Present Disclosure is Applied

FIG. 16 illustrates a wireless device which may be applied to the present disclosure.

Referring to FIG. 16, a first wireless device 100 and a second wireless device 200 may transmit/receive radio signals through various wireless access technologies (e.g., LTE and NR). Here, the first wireless device 100 and the second wireless device 200 may correspond to a wireless device 100*x* and a BS 200 and/or a wireless device 100*x* and a wireless device 100*x* of FIG. 16.

The first wireless device 100 may include one or more processors 102 and one or more memories 104 and additionally further include one or more transceivers 106 and/or one or more antennas 108. The processor 102 may control the memory 104 and/or the transceiver 106 and may be configured to implement descriptions, functions, procedures, proposals, methods, and/or operation flows disclosed in the present disclosure. For example, the processor 102 may process information in the memory 104 and generate a first information/signal and then transmit a radio signal including the first information/signal through the transceiver 106. Further, the processor 102 may receive a radio signal including a second information/signal through the transceiver 106 and then store in the memory 104 information obtained from signal processing of the second information/signal. The memory 104 may connected to the processor 102 and store various information related to an operation of the processor 102. For example, the memory 104 may store a software code including instructions for performing some or all of processes controlled by the processor 102 or performing the descriptions, functions, procedures, proposals, methods, and/or operation flowcharts disclosed in the present disclosure. Here, the processor 102 and the memory 104 may be a part of a communication modem/circuit/chip designated to implement the wireless communication technology (e.g., LTE and NR). The transceiver 106 may be connected to the processor 102 and may transmit and/or receive the radio signals through one or more antennas 108. The transceiver 106 may include a transmitter and/or a receiver. The transceiver 106 may be used mixedly with a radio frequency (RF) unit. In the present disclosure, the wireless device may mean the communication modem/circuit/chip.

The second wireless device 200 may include one or more processors 202 and one or more memories 204 and additionally further include one or more transceivers 206 and/or one or more antennas 208. The processor 202 may control the memory 204 and/or the transceiver 206 and may be configured to implement descriptions, functions, procedures, proposals, methods, and/or operation flows disclosed in the present disclosure. For example, the processor 202 may process information in the memory 204 and generate a third information/signal and then transmit a radio signal including the third information/signal through the transceiver 206. Further, the processor 202 may receive a radio signal including a fourth information/signal through the transceiver 206 and then store in the memory 204 information obtained from signal processing of the fourth information/signal. The memory 204 may connected to the processor 202 and store various information related to an operation of the processor 202. For example, the memory 204 may store a software code including instructions for performing some or all of processes controlled by the processor 202 or performing the descriptions, functions, procedures, proposals, methods, and/or operation flowcharts disclosed in the present disclosure. Here, the processor 202 and the memory 204 may be a part of a communication modem/circuit/chip designated to implement the wireless communication technology (e.g., LTE and NR). The transceiver 206 may be connected to the processor 202 and may transmit and/or receive the radio signals through one or more antennas 208. The transceiver 206 may include a transmitter and/or a receiver and the transceiver 206 may be mixed with the RF unit. In the present disclosure, the wireless device may mean the communication modem/circuit/chip.

Hereinafter, hardware elements of the wireless devices 100 and 200 will be described in more detail. Although not limited thereto, one or more protocol layers may be implemented by one or more processors 102 and 202. For example, one or more processors 102 and 202 may implement one or more layers (e.g., functional layers such as PHY, MAC, RLC, PDCP, RRC, and SDAP). One or more processors 102 and 202 may generate one or more protocol data units (PDUs) and/or one or more service data units (SDUs) according to the descriptions, functions, procedures, proposals, methods, and/or operation flowcharts disclosed in the present disclosure. One or more processors 102 and 202 may generate a message, control information, data, or information according to the descriptions, functions, procedures, proposals, methods, and/or operation flowcharts disclosed in the present disclosure. One or more processors 102 and 202 may generate a signal (e.g., a baseband signal) including the PDU, the SDU, the message, the control information, the data, or the information according to the function, the procedure, the proposal, and/or the method disclosed in the present disclosure and provide the generated signal to one or more transceivers 106 and 206. One or more processors 102 and 202 may receive the signal (e.g., baseband signal) from one or more transceivers 106 and 206 and acquire the PDU, the SDU, the message, the control information, the data, or the information according to the descriptions, functions, procedures, proposals, methods, and/or operation flowcharts disclosed in the present disclosure.

One or more processors 102 and 202 may be referred to as a controller, a microcontroller, a microprocessor, or a microcomputer. One or more processors 102 and 202 may be implemented by hardware, firmware, software, or a combination thereof. As one example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in one or more processors 102 and 202. The descriptions, functions, procedures, proposals, and/or operation flowcharts disclosed in the present disclosure may be implemented by using firmware or software and the firmware or software may be implemented to include modules, procedures, functions, and the like. Firmware or software configured to perform the descriptions, functions, procedures, proposals, and/or operation flowcharts disclosed in the present disclosure may be included in one or more processors 102 and 202 or stored in one or more memories 104 and 204 and driven by one or more processors 102 and 202. The descriptions, functions, procedures, proposals, and/or operation flowcharts disclosed in the present disclosure may be implemented by using firmware or software in the form of a code, the instruction and/or a set form of the instruction.

One or more memories 104 and 204 may be connected to one or more processors 102 and 202 and may store various types of data, signals, messages, information, programs, codes, instructions, and/or commands. One or more memories 104 and 204 may be configured by a ROM, a RAM, an EPROM, a flash memory, a hard drive, a register, a cache memory, a computer reading storage medium, and/or a combination thereof. One or more memories 104 and 204 may be positioned inside and/or outside one or more processors 102 and 202. Further, one or more memories 104 and 204 may be connected to one or more processors 102 and 202 through various technologies such as wired or wireless connection.

One or more transceivers 106 and 206 may transmit to one or more other devices user data, control information, a wireless signal/channel, etc., mentioned in the methods and/or operation flowcharts of the present disclosure. One or more transceivers 106 and 206 may receive from one or more other devices user data, control information, a wireless signal/channel, etc., mentioned in the descriptions, functions, procedures, proposals, methods, and/or operation flowcharts disclosed in the present disclosure. For example, one or more transceivers 106 and 206 may be connected to one or more processors 102 and 202 and transmit and receive the radio signals. For example, one or more processors 102 and 202 may control one or more transceivers 106 and 206 to transmit the user data, the control information, or the radio signal to one or more other devices. Further, one or more processors 102 and 202 may control one or more transceivers 106 and 206 to receive the user data, the control information, or the radio signal from one or more other devices. Further, one or more transceivers 106 and 206 may be connected to one or more antennas 108 and 208 and one or more transceivers 106 and 206 may be configured to transmit and receive the user data, control information, wireless signal/channel, etc., mentioned in the descriptions, functions, procedures, proposals, methods, and/or operation flowcharts disclosed in the present disclosure through one or more antennas 108 and 208. In the present disclosure one or more antennas may be a plurality of physical antennas or a plurality of logical antennas (e.g., antenna ports). One or more transceivers 106 and 206 may convert the received radio signal/channel from an RF band signal to a baseband signal in order to process the received user data, control information, radio signal/channel, etc., by using one or more processors 102 and 202. One or more transceivers 106 and 206 may convert the user data, control information, radio signal/channel, etc., processed by using one or more processors 102 and 202, from the baseband signal into the RF band signal. To this end, one or more transceivers 106 and 206 may include an (analog) oscillator and/or filter.

Example of Signal Processing Circuit to Which Present Disclosure is Applied

FIG. 17 illustrates a signal processing circuit for a transmit signal.

Referring to FIG. 17 a signal processing circuit 1000 may include a scrambler 1010, a modulator 1020, a layer mapper 1030, a precoder 1040, a resource mapper 1050, and a signal generator 1060. Although not limited thereto, an operation/function of FIG. 17 may be performed by the processors 102 and 202 and/or the transceivers 106 and 206 of FIG. 16. Hardware elements of FIG. 17 may be implemented in the processors 102 and 202 and/or the transceivers 106 and 206 of FIG. 16. For example, blocks 1010 to 1060 may be implemented in the processors 102 and 202 of FIG. 16. Further, blocks 1010 to 1050 may be implemented in the processors 102 and 202 of FIG. 16 and the block 1060 may be implemented in the transceivers 106 and 206 of FIG. 16.

A codeword may be transformed into a radio signal via the signal processing circuit 1000 of FIG. 17. Here, the codeword is an encoded bit sequence of an information block. The information block may include transport blocks (e.g., a UL-SCH transport block and a DL-SCH transport block). The radio signal may be transmitted through various physical channels (e.g., PUSCH and PDSCH).

Specifically, the codeword may be transformed into a bit sequence scrambled by the scrambler 1010. A scramble sequence used for scrambling may be generated based on an initialization value and the initialization value may include ID information of a wireless device. The scrambled bit sequence may be modulated into a modulated symbol sequence by the modulator 1020. A modulation scheme may include pi/2-Binary Phase Shift Keying (pi/2-BPSK), m-Phase Shift Keying (m-PSK), m-Quadrature Amplitude Modulation (m-QAM), etc. A complex modulated symbol sequence may be mapped to one or more transport layers by the layer mapper 1030. Modulated symbols of each transport layer may be mapped to a corresponding antenna port(s) by the precoder 1040 (precoding). Output z of the precoder 1040 may be obtained by multiplying output y of the layer mapper 1030 by precoding matrix W of N*M. Here, N represents the number of antenna ports and M represents the number of transport layers. Here, the precoder 1040 may perform precoding after performing transform precoding (e.g., DFT transform) for complex modulated symbols. Further, the precoder 1040 may perform the precoding without performing the transform precoding.

The resource mapper 1050 may map the modulated symbols of each antenna port to a time-frequency resource. The time-frequency resource may include a plurality of symbols (e.g., CP-OFDMA symbol and DFT-s-OFDMA symbol) in a time domain and include a plurality of subcarriers in a frequency domain. The signal generator 1060 may generate the radio signal from the mapped modulated symbols and the generated radio signal may be transmitted to another device through each antenna. To this end, the signal generator 1060 may include an Inverse Fast Fourier Transform (IFFT) module, a Cyclic Prefix (CP) insertor, a Digital-to-Analog Converter (DAC), a frequency uplink converter, and the like.

A signal processing process for a receive signal in the wireless device may be configured in the reverse of the signal processing process (1010 to 1060) of FIG. 17. For example, the wireless device (e.g., 100 or 200 of FIG. 16) may receive the radio signal from the outside through the antenna port/transceiver. The received radio signal may be transformed into a baseband signal through a signal reconstructer. To this end, the signal reconstructer may include a frequency downlink converter, an analog-to-digital converter (ADC), a CP remover, and a Fast Fourier Transform (FFT) module. Thereafter, the baseband signal may be reconstructed into the codeword through a resource de-mapper process, a postcoding process, a demodulation process, and a de-scrambling process. The codeword may be reconstructed into an original information block via decoding. Accordingly, a signal processing circuit (not illustrated) for the receive signal may include a signal reconstructer, a resource demapper, a postcoder, a demodulator, a descrambler, and a decoder.

Utilization Example of Wireless Device to which Present Disclosure is Applied

FIG. 18 illustrates another example of a wireless device applied to the present disclosure. The wireless device may be implemented as various types according to a use example/service (see FIG. 15).

Referring to FIG. 18, wireless devices 100 and 200 may correspond to the wireless devices 100 and 200 of FIG. 16 and may be constituted by various elements, components, units, and/or modules. For example, the wireless devices 100 and 200 may include a communication unit 110, a control unit 120, and a memory unit 130, and an additional element 140. The communication unit may include a communication circuit 112 and a transceiver(s) 114. For example, the communication circuit 112 may include one or more processors 102 and 202 and/or one or more memories 104 and 204 of FIG. 16. For example, the transceiver(s) 114 may include one or more transceivers 106 and 206 and/or one or more antennas 108 and 208 of FIG. 16. The control unit 120 is electrically connected to the communication unit 110, the memory unit 130, and the additional element 140 and controls an overall operation of the wireless device. For example, the control unit 120 may an electrical/mechanical operation of the wireless device based on a program/code/instruction/information stored in the memory unit 130. Further, the control unit 120 may transmit the information stored in the memory unit 130 to the outside (e.g., other communication devices) through the communication unit 110 via a wireless/wired interface or store information received from the outside (e.g., other communication devices) through the wireless/wired interface through the communication unit 110.

The additional element 140 may be variously configured according to the type of wireless device. For example, the additional element 140 may include at least one of a power unit/battery, an input/output (I/O) unit, a driving unit, and a computing unit. Although not limited thereto, the wireless device may be implemented as a form such as the robot 100*a* of FIG. 15, the vehicles 100*b*-1 and 100*b*-2 of FIG. 15, the XR device 100*c* of FIG. 15, the portable device 100*d* of FIG. 15, the home appliance 100*e* of FIG. 15, the IoT device 100*f* of FIG. 15, a digital broadcasting terminal, a hologram device, a public safety device, an MTC device, a medical device, a fintech device (or financial device), a security device, a climate/environment device, an AI server/device 400 of FIG. 15, the BS 200 of FIG. 15, a network node, etc. The wireless device may be movable or may be used at a fixed place according to a use example/service.

In FIG. 19, all of various elements, components, units, and/or modules in the wireless devices 100 and 200 may be interconnected through the wired interface or at least may be wirelessly connected through the communication unit 110. For example, the control unit 120 and the communication 110 in the wireless devices 100 and 200 may be wiredly connected and the control unit 120 and the first unit (e.g., 130 or 140) may be wirelessly connected through the communication unit 110. Further, each element, component, unit, and/or module in the wireless devices 100 and 200 may further include one or more elements. For example, the control unit 120 may be constituted by one or more processor sets. For example, the control unit 120 may be configured a set of a communication control processor, an application processor, an electronic control unit (ECU), a graphic processing processor, a memory control processor, etc. As another example, the memory 130 may be configured as a random access memory (RAM), a dynamic RAM (DRAM), a read only memory (ROM), a flash memory, a volatile memory, a non-volatile memory, and/or combinations thereof.

Example of Hand-Held Device to which Present Disclosure is Applied

FIG. 19 illustrates a hand-held device applied to the present disclosure. The hand-held device may include a smart phone, a smart pad, a wearable device (e.g., a smart watch, a smart glass), and a hand-held computer (e.g., a notebook, etc.). The hand-held device may be referred to as a Mobile Station (MS), a user terminal (UT), a Mobile Subscriber Station (MSS), a Subscriber Station (SS), an Advanced Mobile Station (AMS), or a Wireless terminal (WT).

Referring to FIG. 19, a hand-held device 100 may include an antenna unit 108, a communication unit 110, a control unit 120, a memory unit 130, a power supply unit 140*a*, an interface unit 140*b*, and an input/output unit 140*c*. The antenna unit 108 may be configured as a part of the communication unit 110. The blocks 110 to 130/140*a* to 140*c* correspond to the blocks 110 to 130/140 of FIG. 18, respectively.

The communication unit 110 may transmit/receive a signal (e.g., data, a control signal, etc.) to/from another wireless device and BSs. The control unit 120 may perform various operations by controlling components of the hand-held device 100. The control unit 120 may include an Application Processor (AP). The memory unit 130 may store data/parameters/programs/codes/instructions required for driving the hand-held device 100. Further, the memory unit 130 may store input/output data/information, etc. The power supply unit 140*a* may supply power to the hand-held device 100 and include a wired/wireless charging circuit, a battery, and the like. The interface unit 140*b* may support a connection between the hand-held device 100 and another external device. The interface unit 140*b* may include various ports (e.g., an audio input/output port, a video input/output port) for the connection with the external device. The input/output unit 140*c* may receive or output a video information/signal, an audio information/signal, data, and/or information input from a user. The input/output unit 140*c* may include a camera, a microphone, a user input unit, a display unit 140*d*, a speaker, and/or a haptic module.

As one example, in the case of data communication, the input/output unit 140*c* may acquire information/signal (e.g., touch, text, voice, image, and video) input from the user and the acquired information/signal may be stored in the memory unit 130. The communication unit 110 may transform the information/signal stored in the memory into the radio signal and directly transmit the radio signal to another wireless device or transmit the radio signal to the eNB. Further, the communication unit 110 may receive the radio signal from another wireless device or eNB and then reconstruct the received radio signal into original information/signal. The reconstructed information/signal may be stored in the memory unit 130 and then output in various forms (e.g., text, voice, image, video, haptic) through the input/output unit 140c.

The embodiments described above are implemented by combinations of components and features of the present disclosure in predetermined forms. Each component or feature should be considered selectively unless specified separately. Each component or feature may be carried out without being combined with another component or feature. Moreover, some components and/or features are combined with each other and can implement embodiments of the present disclosure. The order of operations described in embodiments of the present disclosure may be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the present disclosure can be implemented by various means, for example, hardware, firmware, software, or combinations thereof. When embodiments are implemented by hardware, one embodiment of the present disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present disclosure can be implemented by modules, procedures, functions, etc. performing functions or operations described above. Software code can be stored in a memory and can be driven by a processor. The memory is provided inside or outside the processor and can exchange data with the processor by various well-known means.

It is apparent to those skilled in the art that the present disclosure can be embodied in other specific forms without departing from essential features of the present disclosure. Accordingly, the aforementioned detailed description should not be construed as limiting in all aspects and should be considered as illustrative. The scope of the present disclosure should be determined by rational construing of the appended claims, and all modifications within an equivalent scope of the present disclosure are included in the scope of the present disclosure.

INDUSTRIAL APPLICABILITY

The method for mapping channel state information in a wireless communication system of the present disclosure has been described focusing on examples applied to the 3GPP LTE/LTE-A system and 5G system (New RAT system), but can be applied to various wireless communication systems.

The invention claimed is:

1. A method of reporting channel state information (CSI), by a user equipment (UE), in a wireless communication system, the method comprising:
   receiving bandwidth part (BWP) configuration information related to a BWP;
   receiving information for activating a specific bandwidth part among one or more bandwidth parts based on the BWP configuration information;
   receiving a reference signal;
   obtaining CSI based on the reference signal; and
   transmitting the CSI by omitting a part of the CSI in the activated specific bandwidth part, based on a priority rule,
   wherein the CSI includes information related with coefficients, and each of elements of the information related to the coefficients is classified as a first group and a second group based on a priority value,
   wherein the priority value is determined based on i) a layer index ii) an index of a spatial domain related to each of the elements and iii) an index of a frequency domain related to each of the elements,
   wherein the priority value is determined as an order in which a higher index and a lower index of indexes of a frequency domain related to the elements are sequentially crossed based on a predefined specific index, and
   wherein a priority of the first group is defined as higher than a priority of the second group in the priority rule.

2. The method of claim 1,
   wherein the predefined specific index is related to an index in the frequency domain of a strongest coefficient among the coefficients.

3. The method of claim 2,
   wherein the predefined specific index is 0.

4. The method of claim 1,
   wherein the priority value increases in an ascending order of the index of the spatial domain.

5. The method of claim 1,
   wherein the smaller the priority value, the higher the priority of each element.

6. The method of claim 1,
   wherein a priority of i) the index of the spatial domain of a strongest coefficient and ii) an index of the spatial domain corresponding to a beam having an opposite polarization with respect to a beam corresponding to the strongest coefficient is the highest.

7. The method of claim 1,
   wherein a part of the CSI is omitted and transmitted through the PUSCH.

8. The method of claim 1,
   wherein the CSI includes a first part and a second part, and wherein a potion of the second part is omitted.

9. The method of claim 1,
   wherein the CSI further includes information related to a omission of the portion.

10. The method of claim 9,
    wherein the information related to the omission includes at least one of (i) information on whether to omit, (ii) information on an object to be omitted or (iii) information on a quantity to be omitted.

11. The method of claim 1,
    wherein the information related with coefficients includes at least one of information on a amplitude coefficient, ii) information on a phase coefficient, or iii) bitmap information related to the amplitude coefficient and the phase coefficient.

12. The method of claim 1, further comprising:
receiving configuration information related with the CSI,
wherein a resource region for the CSI report is allocated based on the configuration information, and
wherein a payload size of the obtained CSI exceeds the resource region.

13. A user equipment (UE) for transmitting and receiving data in a wireless communication system, the UE comprises:
one or more transceivers;
one or more processors; and
one or more memories storing instructions for operations executed by the one or more processors and coupled to the one or more processors,
wherein the operations comprises:
receiving bandwidth part (BWP) configuration information related to a BWP;
receiving information for activating a specific bandwidth part among one or more bandwidth parts based on the BWP configuration information;
receiving a reference signal;
obtaining CSI based on the reference signal; and
transmitting the CSI by omitting a part of the CSI in the activated specific bandwidth part, based on a priority rule,
wherein the CSI includes information related with coefficients, and each of elements of the information related to the coefficients is classified as a first group and a second group based on a priority value,
wherein the priority value is determined based on i) a layer index ii) an index of a spatial domain related to each of the elements and iii) an index of a frequency domain related to each of the elements,
wherein the priority value is determined as an order in which a higher index and a lower index of indexes of a frequency domain related to the elements are sequentially crossed based on a predefined specific index, and
wherein a priority of the first group is defined as higher than a priority of the second group in the priority rule.

14. A method of receiving channel state information (CSI), by a base station, in a wireless communication system, the method comprising:
transmitting, to a user equipment (UE), bandwidth part (BWP) configuration information related to a BWP;
transmitting, to the UE, information for activating a specific bandwidth part among one or more bandwidth parts based on the BWP configuration information;
transmitting, to the UE, a reference signal; and
receiving, from the UE, a CSI report in which part of the CSI measured based on the reference signal are omitted based on the priority rule,
wherein the CSI report is received based on the activated specific bandwidth part,
wherein the CSI includes information related with coefficients, and each of elements of the information related to the coefficients is classified as a first group and a second group based on a priority value,
wherein the priority value is determined based on i) a layer index ii) an index of a spatial domain related to each of the elements and iii) an index of a frequency domain related to each of the elements,
wherein the priority value is determined as an order in which a higher index and a lower index of indexes of a frequency domain related to the elements are sequentially crossed based on a predefined specific index, and
wherein a priority of the first group is defined as higher than a priority of the second group in the priority rule.

* * * * *